(12) United States Patent
Wong et al.

(10) Patent No.: US 9,881,472 B2
(45) Date of Patent: Jan. 30, 2018

(54) TAG AND HYBRID SECURITY SYSTEM WITH THE TAG

(71) Applicant: Sonne International Company Limited, Hong Kong (CN)

(72) Inventors: Bik Kwan Bikie Wong, Hong Kong (CN); Wai Man Lau, Hong Kong (CN)

(73) Assignee: Sonne International Company Limited, Tsuen Wan (HK)

( * ) Notice: Subject to any disclaimer, the term of this patent is extended or adjusted under 35 U.S.C. 154(b) by 0 days.

(21) Appl. No.: 15/236,985

(22) Filed: Aug. 15, 2016

(65) Prior Publication Data

US 2016/0351035 A1     Dec. 1, 2016

(51) Int. Cl.
*G08B 13/189* (2006.01)
*G08B 13/24* (2006.01)
*G06K 19/067* (2006.01)
*G06K 19/07* (2006.01)

(52) U.S. Cl.
CPC ..... *G08B 13/2434* (2013.01); *G06K 19/0672* (2013.01); *G06K 19/0723* (2013.01)

(58) Field of Classification Search
CPC ............ G08B 13/2448; G08B 13/2417; G08B 13/2422
USPC ...................................................... 340/572.1
See application file for complete search history.

(56) References Cited

U.S. PATENT DOCUMENTS

| | | | | |
|---|---|---|---|---|
| 2006/0027240 A1* | 2/2006 | Chole | .......... | G06F 19/327 128/898 |
| 2009/0189768 A1* | 7/2009 | Copeland | .......... | G08B 13/2408 340/572.7 |
| 2010/0225448 A1* | 9/2010 | Arguin | .......... | G08B 13/2411 340/10.1 |
| 2012/0055944 A1* | 3/2012 | Hesch, Jr. | .......... | E05B 73/0017 220/751 |
| 2012/0068825 A1* | 3/2012 | Leone | .......... | G08B 13/2417 340/10.1 |
| 2012/0091741 A1* | 4/2012 | Stewart | .......... | E05B 73/0017 292/307 A |
| 2013/0141242 A1* | 6/2013 | Ho | .......... | E05B 73/0017 340/572.1 |
| 2013/0206842 A1* | 8/2013 | Raz | .......... | G06K 19/02 235/488 |
| 2013/0340489 A1* | 12/2013 | Kozlowski, Jr. | .... | E05B 73/0017 70/57.1 |

(Continued)

*Primary Examiner* — Kevin Kim
(74) *Attorney, Agent, or Firm* — Muncy, Geissler, Olds & Lowe, P.C.

(57) ABSTRACT

A tag and a hybrid security system with the tag are disclosed. A combination tag combined a passive RFID tag and an AM tag includes a passive RFID tag; an AM tag; and an enclosure housing the RFID tag and the AM tag. The hybrid security system includes a pedestal embedded with an EAS antenna and a RFID antenna; and a RFID reader, wherein the pedestal is configured to sense the AM tag of the combination tag and trigger the RFID reader to read the RFID tag of the combination tag when presence of the AM tag is sensed. A security tag is also disclosed, including an enclosure having a PP top housing and a PP bottom housing; an AM tag housed in the enclosure; and a lock mechanism securing the security tag onto a person's wristband; wherein the security tag has a color characteristic for identification of persons.

10 Claims, 18 Drawing Sheets

(56) References Cited

U.S. PATENT DOCUMENTS

| | | | | |
|---|---|---|---|---|
| 2014/0225734 A1* | 8/2014 | Rasband | ............... | G08B 13/246 340/572.1 |
| 2014/0232530 A1* | 8/2014 | Stewart | ............... | E05B 73/0064 340/10.5 |
| 2015/0342031 A1* | 11/2015 | Song | .................. | H01Q 15/0026 174/350 |

* cited by examiner

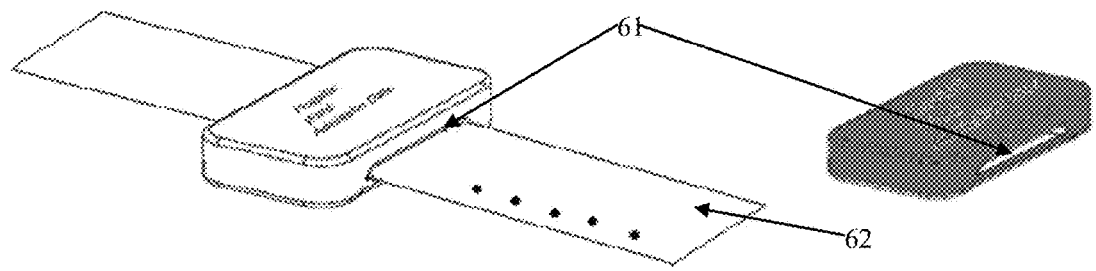
Fig. 6A          Fig. 6B
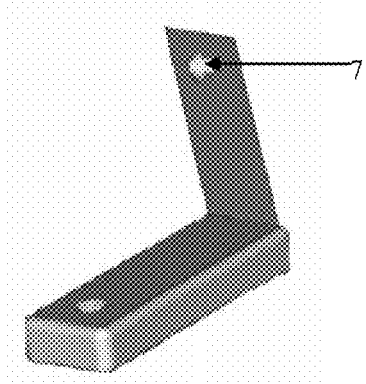
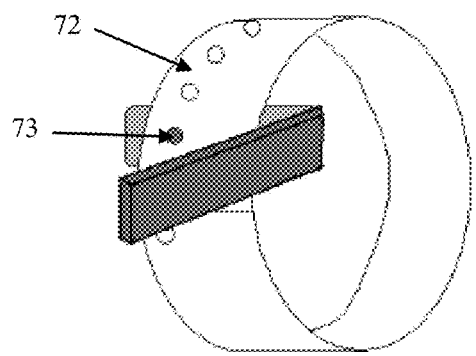
Fig. 7A          Fig. 7B
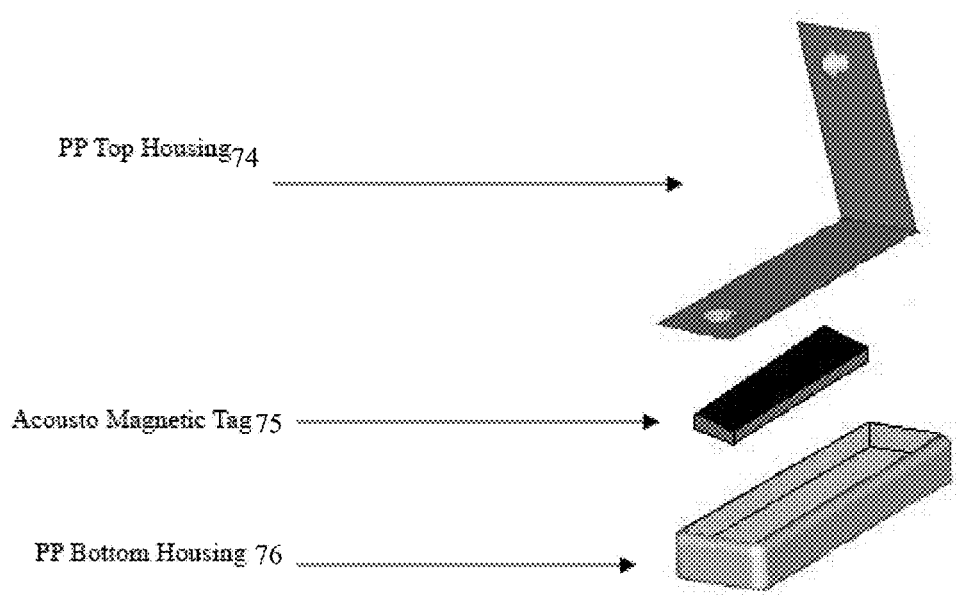
Fig. 7C

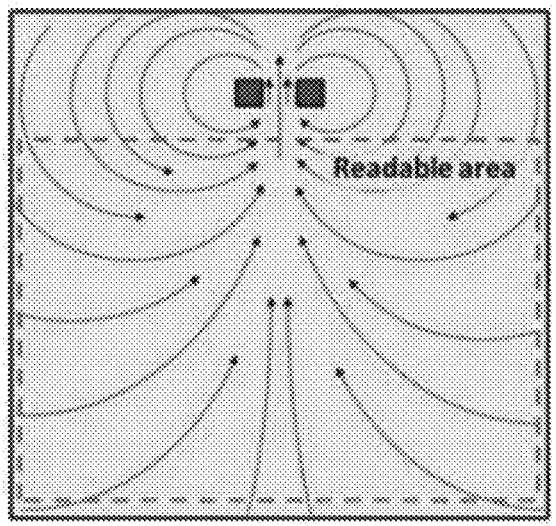
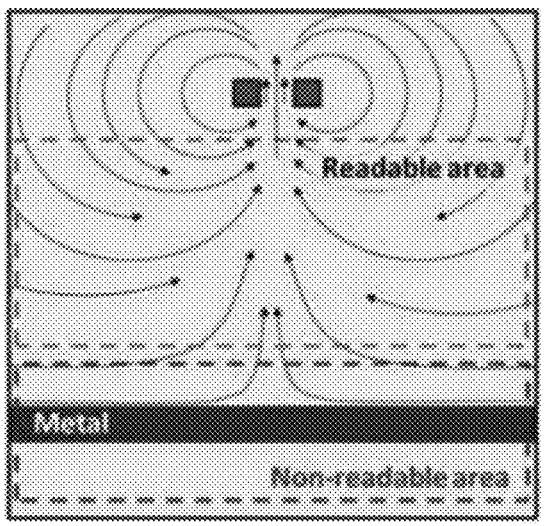
Fig. 12A                    Fig. 12B
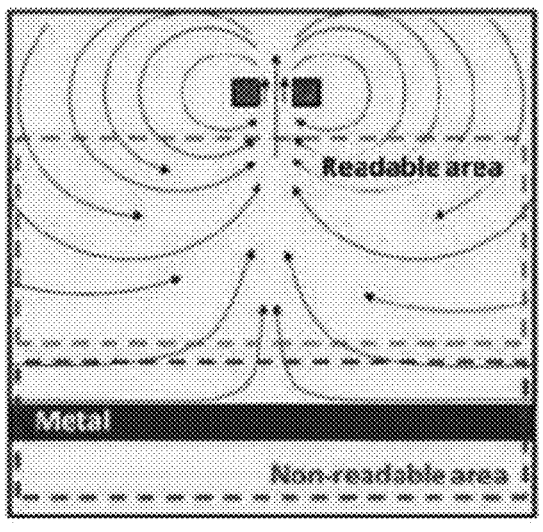
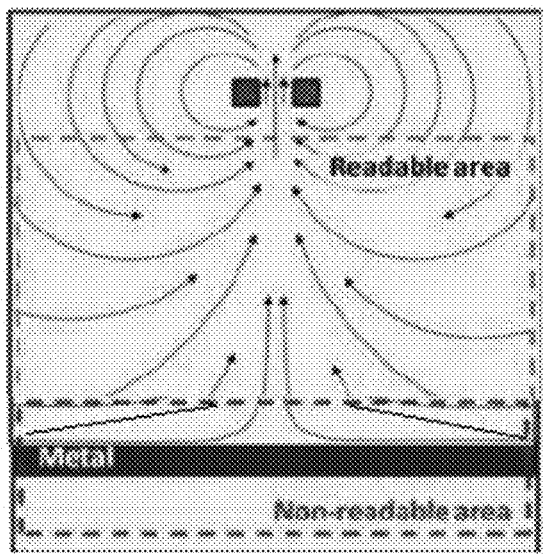
Fig. 13A                    Fig. 13B

TAG AND HYBRID SECURITY SYSTEM WITH THE TAG

TECHNICAL FIELD

The present application is directed to a tag and a hybrid security system with the tag.

BACKGROUND

Current active RFID/passive RFID systems are turned on 24 hours which may cause Electromagnetic interference to medical devices used in hospital. Furthermore, the electromagnetic fields generated by RFID readers have been measured in laboratory conditions, as recounted in a report by AFSSET, the French agency for safety in the environment and at work, renamed Anses in 2010. The field emitted in the LF and HF bands quickly fades and is only significant in the immediate vicinity of a reader. In any case, this radiation remains lower than the threshold limit value for humans recommended by the ICNIRP, the International Commission on Non-Ionizing Radiation Protection (maximum permitted magnetic field=400 nT for HF technology and 105 nT for UHF). Although, in UHF frequency bands, the magnetic fields span greater distances, measurements have shown that the radiation does not exceed the threshold limit values.

Another test performed by department of electrical engineering at University of Texas at Arlington, Tex., USA concluded that if the RFID reader antennas at distances of 10 cm from the human head operating additively, it will contribute to a SAR in the human head of up to a maximum of 2.02763 W/kg, which is above the limit for safe exposure of RF radiation as allowed by FCC in US. The prolong exposure to this RF radiation may cause side effect to human body.

SUMMARY

The present patent application is directed to a tag and a hybrid security system with the tag. In one aspect, there is provided a combination tag combined a passive radio frequency identification (RFID) tag and an acousto-magnetic (AM) tag, including: a passive RFID tag; an AM tag; and an enclosure housing the RFID tag and the AM tag.

The combination tag may further include a spacer housed in the enclosure and disposed between the RFID tag and the AM tag. The spacer may be a layer of low dielectric constant material having a thickness ranging from 3 mm to 10 mm.

The spacer may be used as a support for the tags positioning and is soft in structure.

The AM tag may include a bias magnetic layer and a strip of amorphous alloy, and the strip of amorphous alloy is far away from the RFID tag.

The enclosure may be made of ABS plastic or silicone rubber.

The enclosure may include a top housing and a bottom housing. A write-on surface pad may be disposed on a top surface of the top housing. The bottom housing may have a thickness of 1 mm. A 3M sticker may be disposed on a bottom surface of the bottom housing.

In another aspect, there is provided a hybrid security system with the combination tag, including: a pedestal embedded with an electronic article surveillance (EAS) antenna and a RFID antenna; and a RFID reader, wherein the pedestal is configured to sense the AM tag of the combination tag and trigger the RFID reader to read the RFID tag of the combination tag when presence of the AM tag is sensed.

The security system may further include an EAS relay and an EAS controller; wherein the EAS controller uses an output of the EAS relay to trigger a general purpose input/output (GPIO) of the RFID reader; and the RFID reader is configured to automatically check status of the GPIO and allow the RFID antenna to emit RF for a period preset by a user when the GPIO is high input.

There is also provided a security tag, including: an enclosure having a PP top housing and a PP bottom housing; an acousto-magnetic (AM) tag housed in the enclosure; and a lock mechanism securing the security tag onto a person's wristband; wherein the security tag has a color characteristic for identification of persons.

BRIEF DESCRIPTION OF THE DRAWINGS

FIGS. 6A-6B illustrate a wristband with the combination tag of the second embodiment.

FIGS. 7A-7C illustrate an one-click band with a single AM tag of a third embodiment of the present application.

FIGS. 12A-12B illustrate the effect of a metal layer on an alternating magnetic field.

FIGS. 13A-13B illustrate how the orientation of AM tag can affect the read range of UHF tag.

DETAILED DESCRIPTION

Reference will now be made in detail to a preferred embodiment of the combination tag and the security system with the same disclosed in the present patent application, examples of which are also provided in the following description. Exemplary embodiments of the combination tag and the security system with the same disclosed in the present patent application are described in detail, although it will be apparent to those skilled in the relevant art that some features that are not particularly important to an understanding of the combination tag and the security system with the same may not be shown for the sake of clarity.

Furthermore, it should be understood that the combination tag and the security system with the same disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
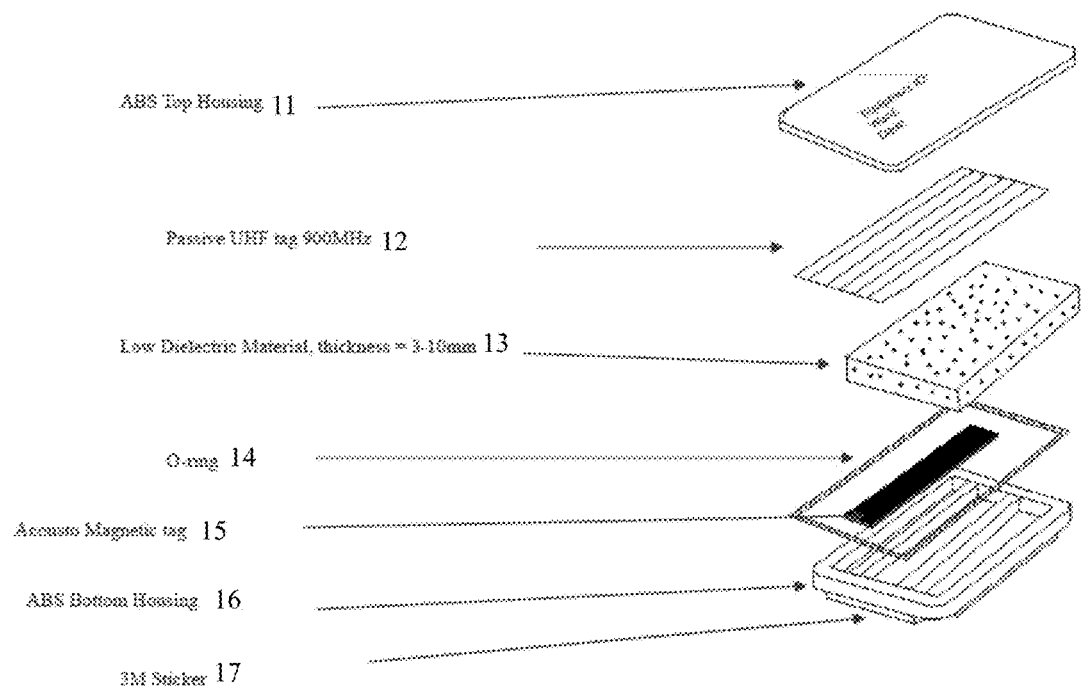
FIG. 1 is an exploded view of a combination tag according to a first embodiment of the present application (Reusable).
Figure 5:
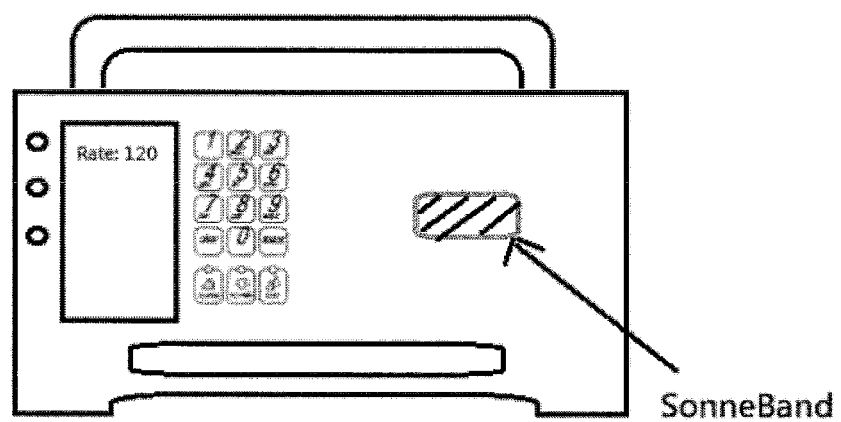
FIG. 5 illustrates that the combination tag of the first embodiment is stuck onto medical devices.

FIG. 1 is an exploded view of a reusable combination tag according to a first embodiment of the present application. As shown in FIG. 1, the combination tag includes: an ABS (Acrylonitrile Butadiene Styrene) plastic top housing 11, a passive RFID tag (for example, UHF tag at 900 MHz) 12, a spacer 13, an O-ring 14, an acousto-magnetic (AM) tag 15, an ABS plastic bottom housing 16 in sequence from the top to the bottom. The ABS top housing 11 and the ABS bottom housing 16 form an enclosure that houses the RFID tag 12, the spacer 13, the O-ring 14, and the AM tag 15. In the embodiment, the spacer 13 is a layer of low dielectric material having the thickness ranging from 3 mm to 10 mm which may improve the read range of the UHF tag 12. Furthermore, a 3M sticker 17 is disposed on the bottom surface of the ABS bottom housing 16. As shown in FIG. 5, the combination tag may be stuck onto medical devices by the 3M sticker 17 and can be used for Hospital Asset Management. The tags may comply with IP 57 requirement and can be sterilized. Tag's information can be read or written for infinite time. The Physical Size of the tag is: L 5.6 cm×W 3 cm×H 1.32 cm, depending on middle spacer thickness.

Figure 2:
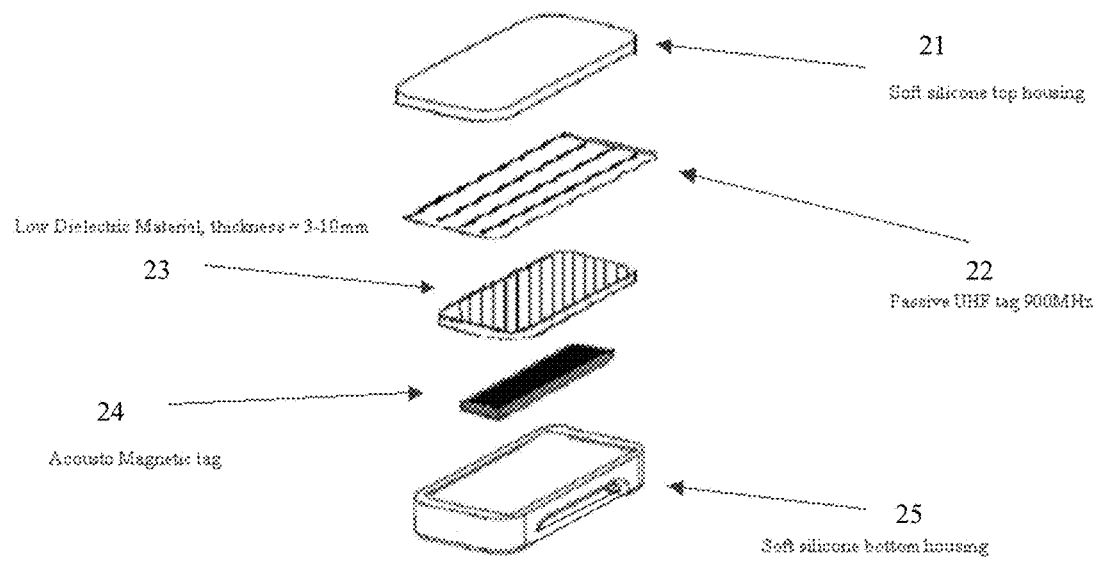
FIG. 2 is an exploded view of a combination tag according to a second embodiment of the present application (Disposable).

FIG. 2 is an exploded view of a disposable combination tag according to a second embodiment of the present application. As shown in FIG. 2, the combination tag includes: a soft silicone top housing 21, a passive RFID tag (for example, UHF tag at 900 MHz) 22, a spacer 23, an acousto-magnetic (AM) tag 24, a soft silicone bottom housing 25 in sequence from the top to the bottom. The soft silicone top housing 21 and the soft silicone bottom housing 25 form an enclosure that houses the RFID tag 22, the spacer 23, and the AM tag 24. In the embodiment, the spacer is a layer of low dielectric material having the thickness ranging from 3 mm to 10 mm. In the embodiment, the high medical grade Silicone rubber housings ensure comfort of the patient. The tag, which is latex free and chemical free, is designed for a single patient used to minimize cross infection. Its physical size is: L 5.5 cm×W 2.6 cm×H 1.42 cm, depending on middle spacer thickness. As shown in FIGS. 6A and 6B, the combination tag may be used with a band (named SonneBand in this present application). The silicone bottom housing 25 contains a hole 61 through which a hospital wristband 62 can pass and is designed to have minimum contact to a patient's skin.

Figure 3:
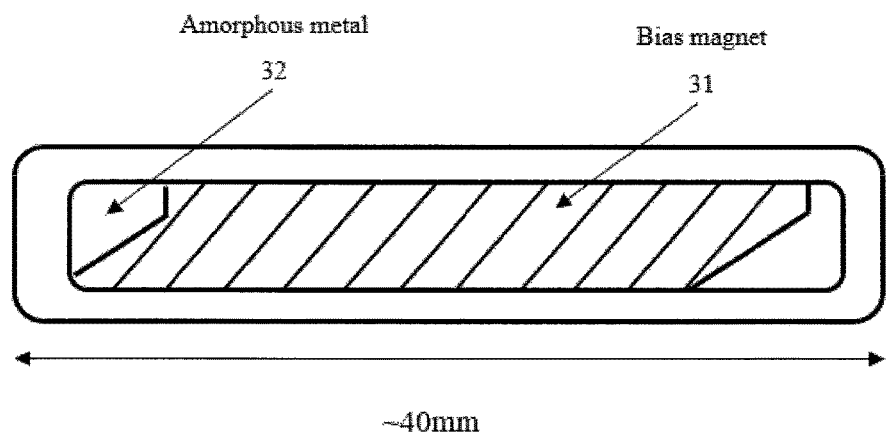
FIG. 3 illustrates the structure of an acousto-magnetic (AM) tag.
Figure 4:
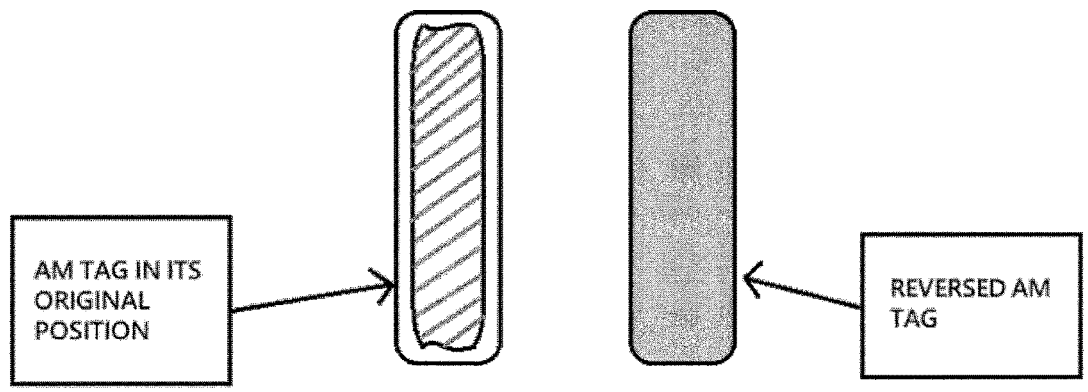
FIG. 4 shows two orientations of the AM tag.

As illustrated in the tests described thereafter, the overlapping between the AM tag and the RFID tag may improve the RFID tag performance on human body since the metal surface of the AM tag can reflect off the RF waves and provide more power to the tag if the position placed properly. Nevertheless, the orientation of the AM tag may affect the UHF tag performance, as there are several different layer of sheet inside AM tag. As shown in FIG. 3, the outside one of the AM tag is a bias magnetic layer 31 with the inner one are some soft strip of amorphous alloy 32. As shown in FIG. 4, if the amorphous alloy 32 places far away from the UHF tag, it can improve the read range of the UHF tag.

In the top surface of the top housing, a write-on surface pad is disposed to allow caregivers for important remarks (Hospital, Ward & Admission Date are preset on the surface) for patient while (Equipment ID, Ward & Date) for Asset. Additionally, the tag has color characteristic, i.e., various choices of color, for example, Red & White for identification of patients.

As shown in FIGS. 7A-C, a security tag includes a PP (Polypropylene) top housing 74, an AM tag 75 and a PP bottom housing 76. The AM tag 75 is housed in an enclosure consisting of the PP top housing 74 and the PP bottom housing 76. One-click band for hospital use with EAS feature is specially designed to work with current HA (Hospital Authority)'s wristband 72. With a lock mechanism 71, it can secure the security tag onto a patient's wristband 72 and cannot reuse. A plurality of through holes 73 are formed on the wristband. The lock mechanism 71 includes a button engaged with respective through holes. Before used, the button 71 is in an open status. In use, the button 71 engages with one of the though holes 73 in the wristband 72 and then is closed. The closed button 71 cannot be re-opened after secured. Durable and soft materials are selected to make the button. Furthermore, the button 71 is in the color of Red & White for identification of patients.

The thickness of the ABS bottom housing 16 or the silicone rubber bottom housing 25 will affect the read range as well since SonneBand is used on human wrist directly which contain high level of water or on medical device which may contain metal as ABS and Silicone have certain dielectric constant while cause detune in RF signal. 1 mm thickness of protective layer (bottom housing) may be used on the contact area.

Figure 8:
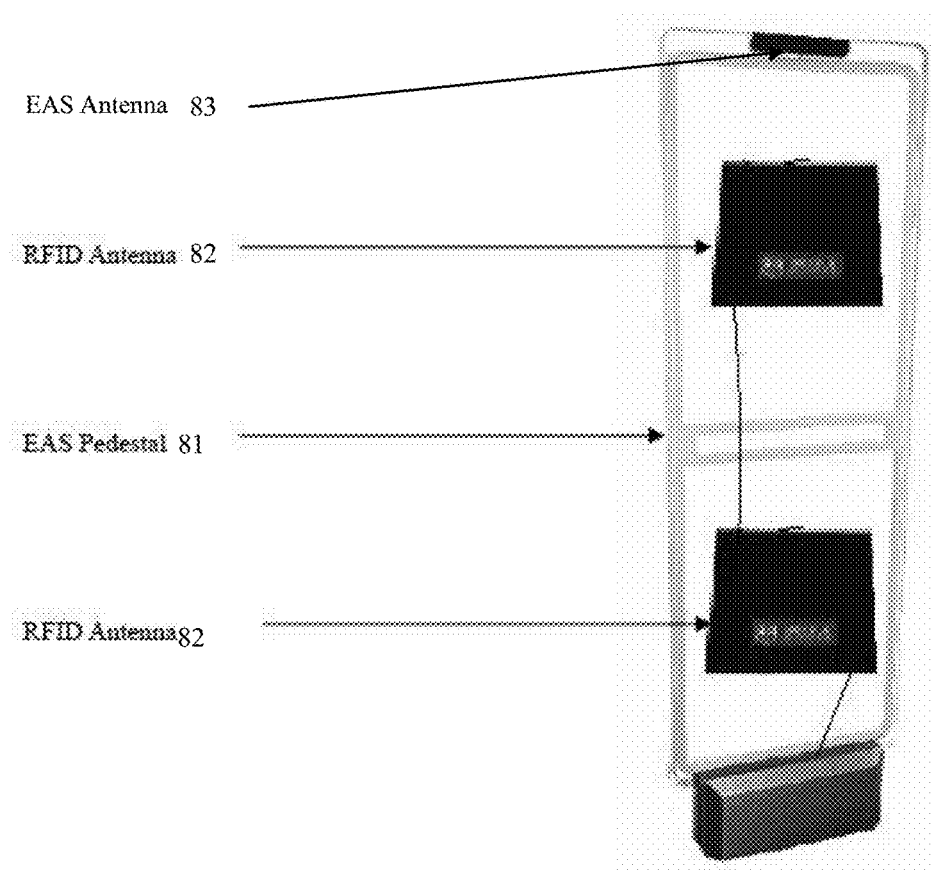
FIG. 8 illustrates an EAS (Electronic Article Surveillance) pedestal with two RFID antennas embedded inside.
Figure 9:
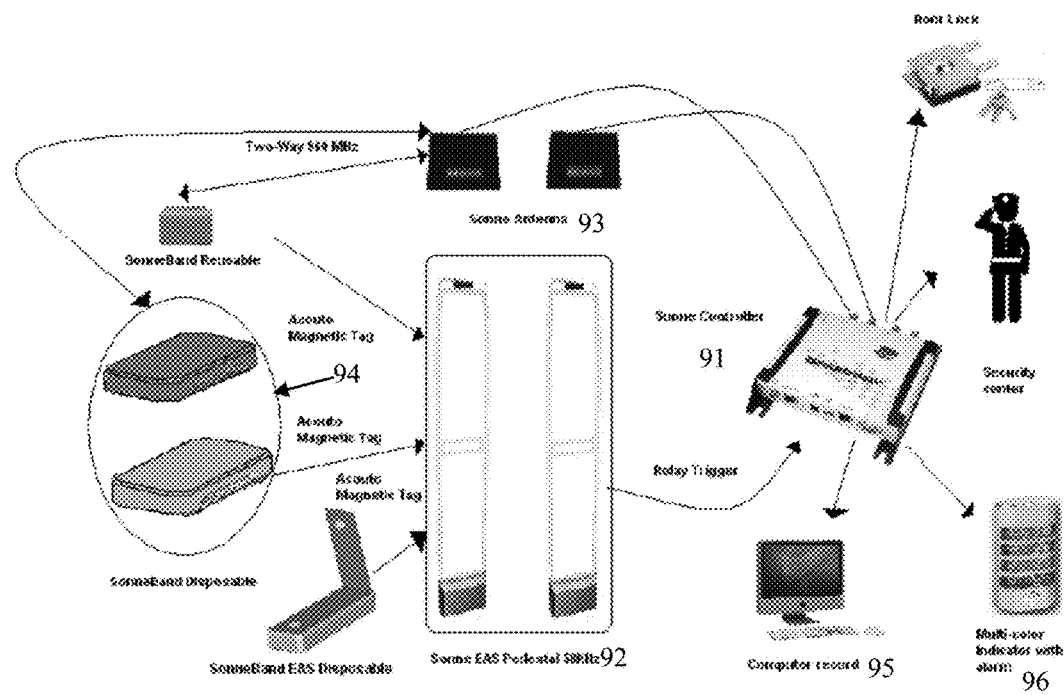
FIG. 9 illustrates a general structure of a hybrid security system according to an embodiment of the present application.

Referring to FIG. 8 and FIG. 9, a hybrid security system is configured for detecting the combination tag attached to articles. As shown in FIG. 8, a pedestal 81 embedded with an EAS antenna 83 and two RFID antennas 82 is designed for detecting the detecting the combination tag. The EAS antenna 83 and the RFID antennas 82 are combined with a cover. The pedestal 81 is made of high transparent acrylic to provide immunity against warping.

Figure 10:
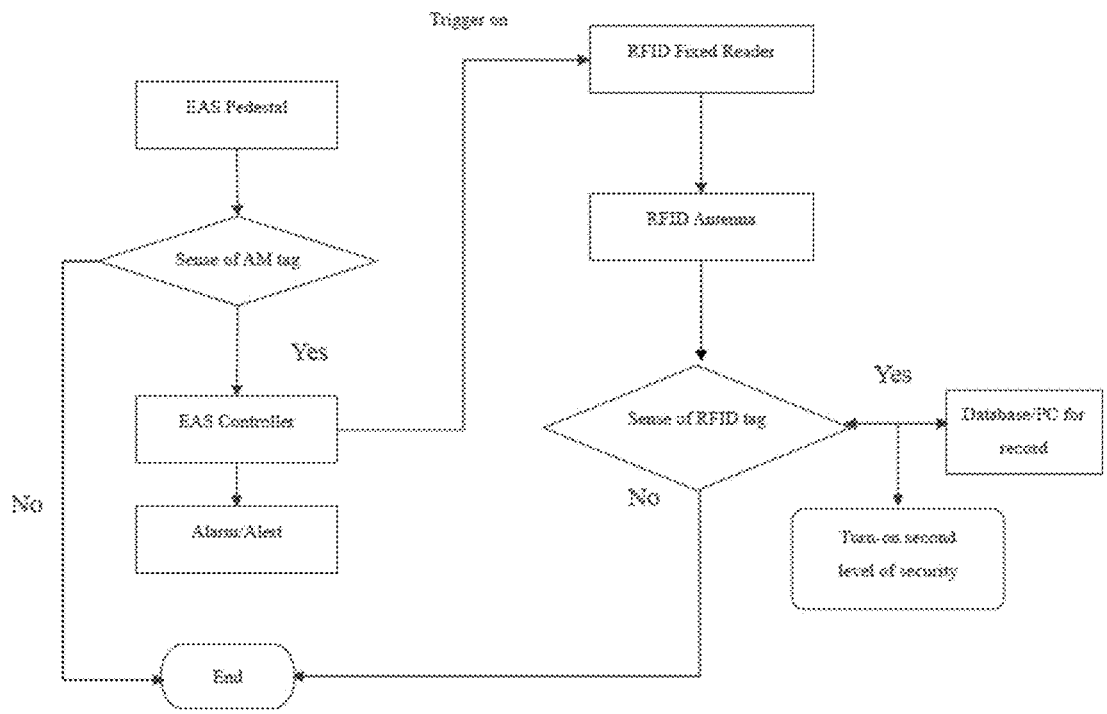
FIG. 10 illustrates a process that triggers the RFID by using the security system.

As shown in FIG. 9, each target zone is required to install at least two pedestals 92 in parallel for operation. In the combination tag 94, the AM tag is the lead component to trigger the security system and the UHF tag is for recording purpose within the read range. As shown in FIG. 10, the pedestal 92 can sense the AM tag of the combination tag. The EAS pedestal 92 of the security system will trigger a RFID fixed reader 91 to allow antennas 93 to emit RF for reading the RFID tag when it senses the presence of the AM Tag. Since the RFID reader 91 works only when the AM tag is detected, it will lower down the electromagnetic interference, power consumption and RF radiation in Hospital environment. Once the data of the RFID tag is read, the RFID fixed reader 91 will send them to a computer 95 for various purposes, for example, confirming whether the combination is valid. In addition, a multi-color indicator with alarm 96 is used to provide the indication and alarm function.

In an embodiment, the pedestal 92 may include a built-in EAS controller. In another embodiment, no EAS controller is embedded inside the pedestal 92. In this case, the security system may include a separate EAS controller configured to connect to the EAS pedestal 92 for powering-up and providing a relay output. In addition, the RFID fixed reader 91 may be a separate reader, or may be combined with a RFID controller together (named Sonne controller).

Figure 11:
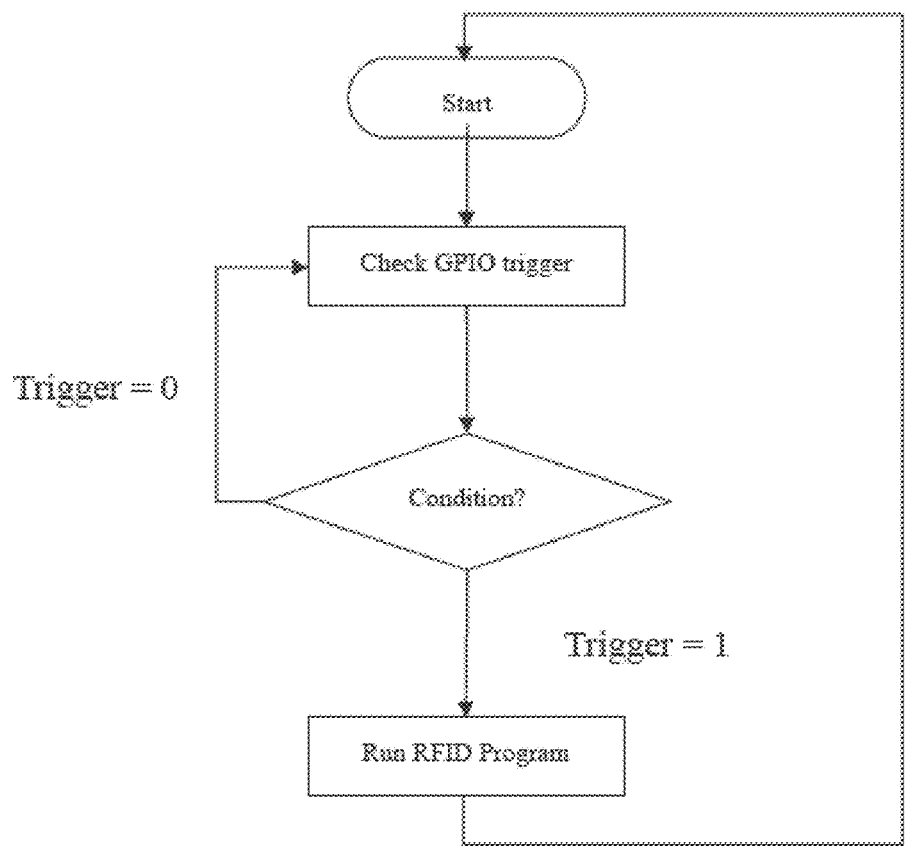
FIG. 11 illustrates a process that automatically checks the RFID GPIO status.

As shown in FIG. 11, the security system uses the EAS relay output to trigger the RFID GPIO. The security system automatically checks the RFID GPIO status. Whenever the GPIO is high input, it will let the RFID antenna emit RF for a period that can set by user. The period is, for example, 30 sec, 60 sec or 90 sec.

The present application is to explore the potentials of implementing RFID technology to support Electronic Article Surveillance (EAS) applications in the hospital security system. It aims at quantitatively assessing the technical performance achievable by means of RFID technology, and is carried out through an extensive experimental conducted.

It is a considerable challenge to develop a passive RFID antenna which can be used in different environment without affecting its performance. It is easily detuned when located on or near a human body, resulting in reduced read range. Thus, the effects of human tissue, such as skin and fat, in close proximity to the antenna must be included in design considerations.

Nevertheless, the RFID tag will detune as well when it placed near a metal object since RF are highly reflected by metal object. When combined with the AM tag, the AM tag is considered as metal object.

According to some research paper on Internet, material of any kind carries what is known as a DIELECTRIC CONSTANT. Essentially, this is the measure of a material's ability to act as a capacitor. Low dielectric materials generally do not reflect RF energy and thus do not reduce the performance of a RFID tag tuned for such a surface. Low dielectric materials (also known as "RF lucent") include:

Dry paper (∈r=2)•Plastic (non-carbon) (∈r=2)•Plate Glass (∈r=5) High dielectric materials tend to reflect more RFID energy and therefore detune a RFID tag tuned for low dielectric surfaces. RF "opaque" materials either absorb or reflect RF signals Metal (∈r=11.5 iron & aluminum)•Carbide powder (∈r=7.5)•Water (∈r=80 at room temp, 55 near boiling temp)•"New" Wood—absorbs (Southern Pine and generally fresh cut wood contains moisture that hinders RF signal)

To address these problems with the existing UHF tag, an optimized spacer in between the UHF tag inlay and the acousto-magnetic tag is needed to be added to minimize detune. Furthermore, a plastic housing is needed to cover the tag to protect it and provide another optimized layer in between the human skin surface and the UHF tag.

The present application goes through the testing with different materials, thickness and tag orientation to provide the optimized solution.

Academic Theory

A free space transmission system consists of a transmitting antenna, a transmission path, transmission medium and a receiving antenna. There is a Friis Transmission Equation (Eq1), which explain this system.

$$P_R = P_T \left(\frac{\lambda}{4\pi R}\right)^2 G_T G_R \quad (1)$$

$P_R$: Received Power
$P_T$: Transmitted Power
R: Distance between transmitting and receiving antenna
$\lambda$: Wavelength
$G_T$: Gain of the transmitting antenna (dBi)
$G_R$: Gain of the receiving antenna (dBi)
G is measured relative to an isotropic antenna (dBi)

From the equation, the main criteria are transmitted power, antenna parameters (gain, polarization and reflection coefficient), wavelength and distance between the antennas. However, for general hospital use, the power and parameters had limitation for patient's safety.

Furthermore, the equation is work well in vacuum since the electromagnetic energy will not absorb. In real situation, if the electromagnetic energy absorb, the distance in between the tag & antenna will be affected.

Using the modified Friis Transmission Equation, the maximum distance of tags in the presence of material products near or in contact with tags can be calculated, under the assumption that the reader antenna has perfect impedance matching and perfect polarization matching to the tag antenna. In addition, Griffin et al. proposed new forms of the power and backscatter communication radio link budgets in terms of the gain penalty based on the modified Friis Transmission Equation, which is the decrease in tag antenna gain from its free space value when attached to a material, and these forms allow RF designers to quantify the effects of tag material attachment, as follows:

$$R_{max,mat} = \frac{\lambda}{4\pi} \sqrt{\frac{P_{reader-tx} \cdot G_{reader-tx} \cdot \tau_{mat}}{L_{sys} \cdot P_{tag,th}} \cdot \left(\frac{G_{tag,fs}}{GP}\right)} \quad (2)$$

where $P_{reader-tx}$ is the input power to the reader antenna, $L_{sys}$ the system loss in both tag and reader, $G_{reader-tx}$ the gain of the reader antenna, $P_{tag,th}$ the minimum threshold power necessary to power up the chip, $G_{tag,fs}$ is tag antenna gain in free space, $\lambda$ is free space wavelength, GP is the gain penalty due to the presence of a material product, and $\tau_{mat}$ the power transmission coefficient in the presence of a material product.

Not to go through the academic equation, but the dielectric constant plays especially in the UHF RFID frequency range an important role. The dielectric constant can vary the antenna impedance that depends upon type of materials. This ultimately causes change in the power transmission coefficient $\tau_{mat}$ with larger of dielectric constant, the smaller in transmission coefficient and smaller in maximum read range of the tag.

For metal object, it will cause greater distortion to the RFID system due to the presence of eddy currents and reflection of RF wave. Refer to FIGS. 12A and 12B, they show that when metal is in the environment, the readable range of the RFID antenna will be lower down. FIG. 12A shows the magnetic field produced by a wire in an environment without metals, and FIG. 12B shows the lines of the magnetic field are distorted by a metallic layer.

Experimentation in the industry has shown that RFID tags are readable if there is a substantial air gap interposed between the tag and the article substrate (human body & metal object). This required air gap is typically at least one quarter of an inch or greater, with increase in thickness, increase in the read range. Because of this well-known relationship between air gap and read performance, various designs have been developed to allow tags to "stand off" from the article substrate in order to create this gap. However, standoff tags are impractical in many commercial applications. The distance created between the tag and the article by the standoff increases the likelihood of the tag being dislodged or damaged in normal use.

Alternately, as noted in the RFID Handbook (Klaus Findenzeller, "RFID Handbook, Second Edition", John Wiley & sons (2003), p 109), "by inserting highly permeable ferrite between the [tag antenna] coil and metal surface, it is possible to largely prevent the occurrence of eddy currents. This makes it possible to mount the antenna on [or within] metal surfaces".

Notwithstanding the reference in the RFID Handbook suggesting the use of highly permeable ferrite, there is little guidance concerning the selection of an appropriate material, nor insight as to a preferred or optimal thickness of the material that should be employed. Therefore, a system for effectively isolating a substrate from an RFID tag, as well as a method for optimizing the performance of RFID tags on the article substrates would represent a significant advance for the use of UHF tag.

In some embodiments, the spacer is made of a selectively chosen material, which might be a closed cell, cross-linked hydrocarbon foam, such as a polyethylene foam, with low dielectric loss, low dielectric constant, and low density. The material or the foam is light-weight, weather resistant and has negligible water absorption and provides excellent thermal insulation, while its dielectric constant does not change with frequency and any change with temperature is negligible.

One of preferred or selectively chosen materials for the spacer is placed between metal surfaces to enable tag operation, and used for isolating the UHF tag and the metal object by reducing electromagnetic interference in free space or closed cavity environments.

In order to closely investigate the impact of different materials on UHF tag performance and to define the best spacer & best thickness, various tests are conducted to evaluate the impact.

Testing Protocol and Experimental Equipments

The following experimental apparatus used to perform the tests:
- The reader used to operate the setup is CONVERGENCE SYSTEMS LIMITED CS469 4-Port RFID Reader
- Two antennas which used for transmission are CS771S Long Range Far Field RFID Antenna
- The RFID tag testing is conducted with the following fixed setting condition:
- Tests will be run by same person for every step
- Retests will be run by another person and measurements recorded by a third party for a fair test
- Right & Left wrist were required to test for every step unless specified
- Wristband material: normal A4 white paper
- RFID tag and Acousto-Magnetic tag are combined and embedded into two different housing (ABS plastic and Silicone Rubber). In the following, SonneBand with different suffix to identify is used.

SonneBand—111
  White ABS plastic with AM tag and RFID tag overlapped inside. In between the overlapping, another layer ABS plastic act as a spacer. The UHF tag was preset to have a Code 111 for identification.
SonneBand—999
  Black ABS plastic with AM tag and RFID tag overlapped inside. In between the overlapping, another thicker layer ABS plastic act as a spacer. The UHF tag was preset to have a Code 999 for identification.
SonneBand—222, 333
  Red & White Silicone Rubber with AM tag and RFID tag side-by-side. The UHF tag was preset to have a Code 333 for red, Code 222 for white as identification.
SonneBand—000
  White Silicone Rubber with AM tag and RFID tag overlapped inside. In between the overlapping, another layer silicone rubber act as a spacer. The UHF tag was preset to have a Code 000 for identification.
Related silicone rubber layer
  This silicone rubber layer is used to add on SonneBand—333,000 (middle & bottom layer) for testing. Each layer has a 2 mm thickness.
Related material layer
  These kinds of layers are used to add on SonneBand—111, 999 (middle & bottom layer) for testing.
  Single ABS plastic layer
  Double ABS plastic layer
  Triple ABS plastic layer
  Double Acrylic plastic layer
  Single Acrylic plastic layer
  Single Foam layer
  Double Foam layer
  Single Dense Material Testing Procedure for Disposable SonneBand
  Test 1—SonneBand 222 RFID tag detection range from two antennas. There will be two parameters changed for each time of test (testing wrist & the thickness of SonneBand). It is used to test the reading range VS tag thickness.
  Test 2—SonneBand 333 RFID tag detection range from two antennas. There will be two parameters changed for each time of test (testing wrist & the thickness of SonneBand). This acts as a control experiment to verify Test 1.
  Test 3—SonneBand 000 RFID tag detection range from two antennas when the UHF tag overlaps with the AM tag. There will be two parameters changed for each time of test (testing wrist & the thickness of SonneBand).
  Test 4—SonneBand 000 RFID tag detection range from two antennas with both wrists used. It is used to test for the spacer performance as well as the orientation of the AM tag and the location placed inside SonneBand.
  Test 5—SonneBand 000 RFID tag detection range from two antennas with different spacer thickness in between the UHF tag & AM tag plus different thickness of silicone layer in between SonneBand and the skin.

Testing Procedure for Reusable SonneBand
  Test 6—Check of SonneBand 111 RFID tag performance with different parameter setting. This provides evidence for the best reading range for SonneBand design consideration.
  Test 7—SonneBand 111 RFID tag detection range from two antennas. It is used to test for the spacer performance and the location placed inside SonneBand.
  Test 8—Check of SonneBand 111 RFID tag performance by reversing the orientation of acousto magnetic tag and see if it can affect the performance of RFID tag.
  Test 9—Check of SonneBand 999 RFID tag performance with different parameter setting. This provides evidence for the best reading range for tag design consideration.

Test Results & Summary
  Test 1—SonneBand 222 RFID tag detection range from two antennas. There will be two parameters changed for each time of test (testing wrist & the thickness of SonneBand). It is used to test the reading range VS tag thickness.

Figure 14A:
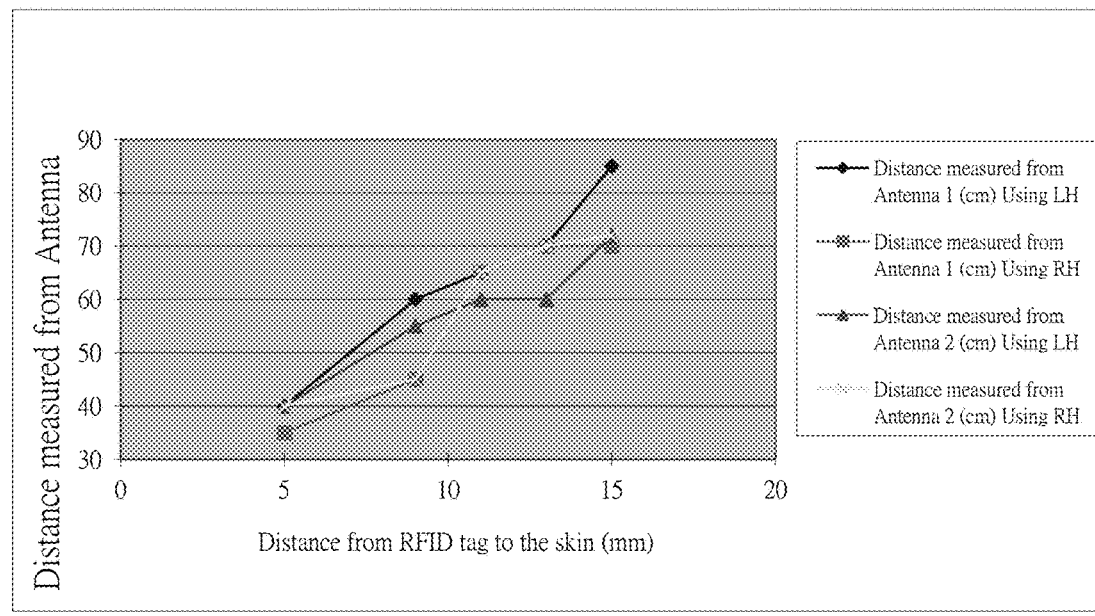
FIGS. 14A-14V illustrate results of various tests investigating the impact of different materials on UHF tag performance to define the best spacer & best thickness.

In the first trial, tag sizes up to 15 mm are tested and results are found in table 1 and also shown in FIG. 14A:

TABLE 1

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 5 | 40 | 35 | 40 | 40 |
| 9 | 60 | 45 | 55 | 45 |

TABLE 1-continued

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 11 | 65 | 65 | 60 | 65 |
| 13 | 70 | 70 | 60 | 70 |
| 15 | 85 | 70 | 72 | 72 |

It is found that the more the separating distance from the RFID tag to the skin is, the further the distance the signal can be read. This increasing trend suggests a thicker tag size can lead to a better performance. To find out how thick it should be for a maximum reading range and to ensure a higher accuracy, a further test is carried out with a wider range of values.

TABLE 2

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 5 | 40 | 35 | 40 | 40 |
| 9 | 60 | 45 | 55 | 45 |
| 11 | 65 | 65 | 60 | 65 |
| 13 | 70 | 70 | 60 | 70 |
| 15 | 85 | 70 | 72 | 72 |
| 17 | 100 | 100 | 95 | 100 |
| 19 | 100 | 100 | 100 | 100 |
| 21 | 100 | 100 | 100 | 100 |
| 23 | 100 | 100 | 100 | 105 |

Figure 14B:
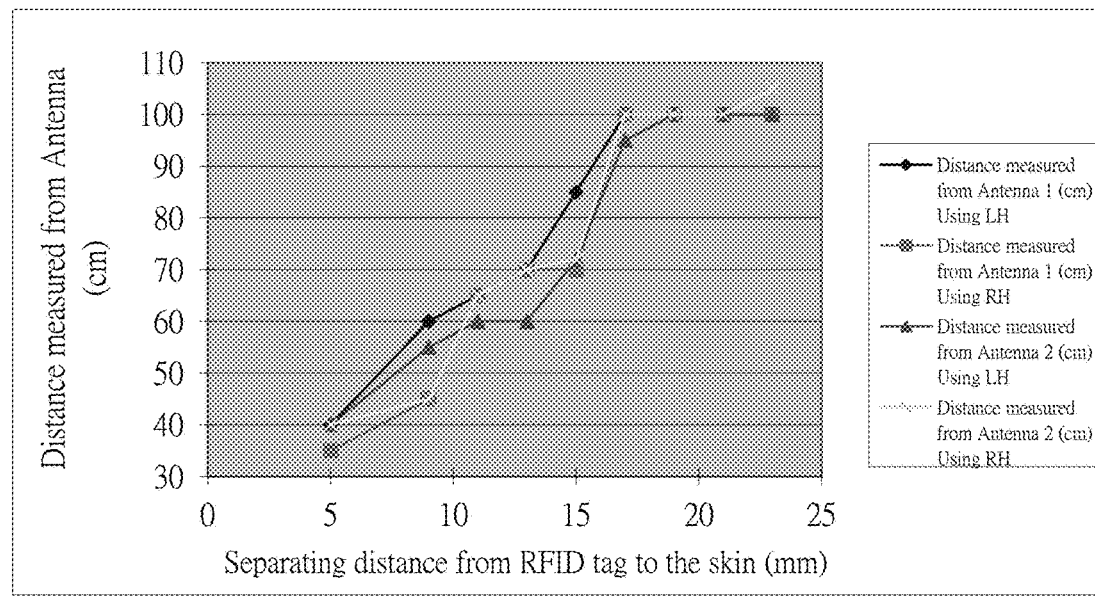

As illustrated in table 2 and also shown in FIG. 14B, this wider range of values supports the above observation that a thicker tag size did lead to a better performance. However, this increasing trend stops after the tag size reaching 17 mm, a constant reading range at 100 cm is seen.

Figure 14C:
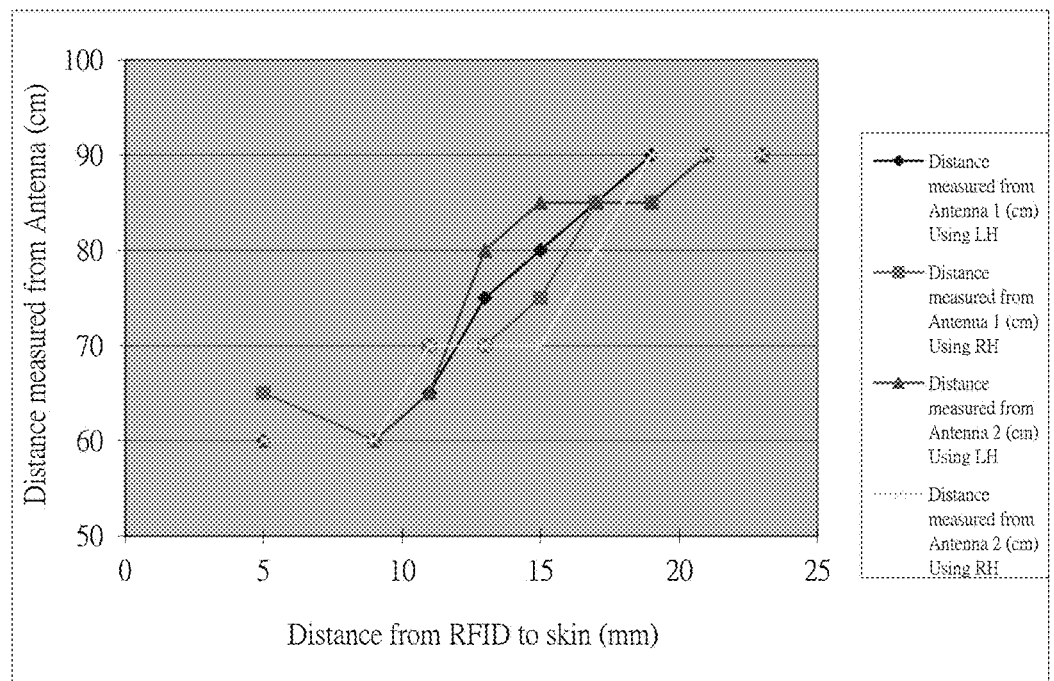

The test is run again by another person to ensure fairness, and the obtained results are as below (table 3 and also shown in FIG. 14C):

TABLE 3

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 5 | 60 | 65 | 60 | 60 |
| 9 | 60 | 70 | 60 | 60 |
| 11 | 65 | 70 | 65 | 60 |
| 13 | 75 | 70 | 80 | 70 |
| 15 | 80 | 75 | 85 | 70 |
| 17 | 85 | 85 | 85 | 80 |
| 19 | 90 | 85 | 85 | 90 |
| 21 | 90 | 90 | 90 | 90 |
| 23 | 90 | 90 | 90 | 90 |

This result runs by another person follows the trend from before, however, the start off point differs slightly, this could be due to the detuning effect of water in human body in different genders.

The distance read in this result varies from 60 cm to 90 cm; it then keeps steady at 90 cm at tag size of 17 mm, while the previous stays at 100 cm at tag size of 17 cm. This consistency suggested that the tag seems to work best when having a thickness of 17 mm, and that it can only receive signals at a maximum of 100 cm away from the Antenna.

Test 2—SonneBand 333 RFID tag detection range from two antennas. There will be two parameters changed for each time of test (testing wrist & the thickness of SonneBand). This acts as a control experiment to verify Test 1.

As a control for Test 1, the same processes have been carried out under the same procedure.

TABLE 4

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 5 | 40 | 35 | 40 | 35 |
| 9 | 50 | 45 | 50 | 45 |
| 11 | 70 | 65 | 70 | 60 |
| 13 | 85 | 75 | 85 | 75 |
| 15 | 100 | 85 | 95 | 85 |

Figure 14D:
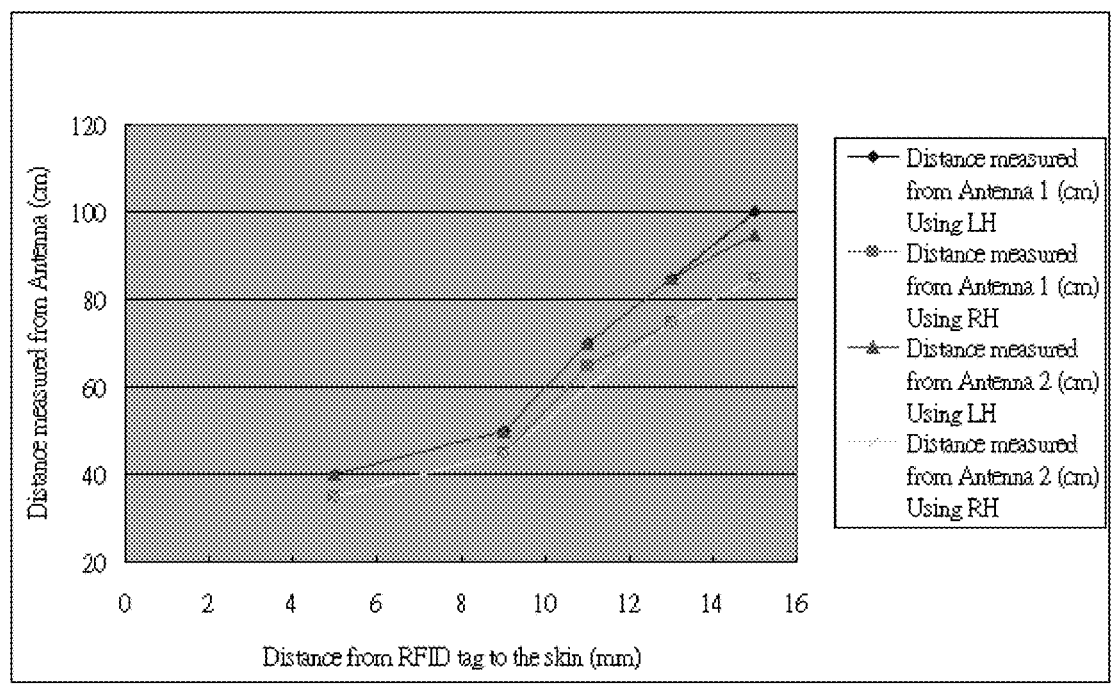

As shown in FIG. 14D, it shows a similar result as Test 1 that an increasing reading trend is lead by an increasing tag size. A further test with a larger range is done to provide evidences to support this.

TABLE 5

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 5 | 45 | 50 | 50 | 50 |
| 9 | 45 | 50 | 45 | 50 |
| 11 | 60 | 60 | 60 | 60 |
| 13 | 70 | 70 | 70 | 75 |
| 15 | 90 | 90 | 90 | 90 |
| 17 | 100 | 100 | 100 | 100 |
| 19 | 110 | 105 | 105 | 105 |
| 21 | 110 | 110 | 105 | 105 |
| 23 | 110 | 110 | 105 | 110 |

Figure 14E:
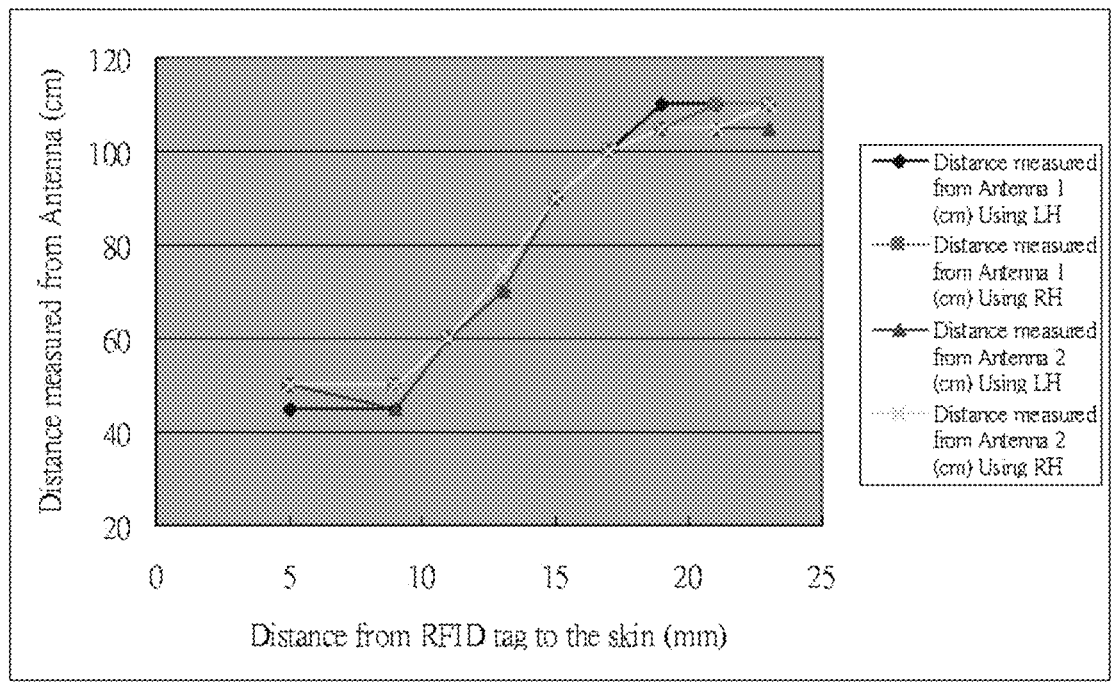

As shown in FIG. 14E, it shows that the observation of having a thicker tag size for a better performance is true. The increasing trend for distance measured from the Antenna remains steady after reaching a tag size of 17 mm. It is therefore believe that for both SonneBand 222, 333 which uses silicone rubber with AM tag and RFID tag side-by-side, a tag size of 17 mm will give the best performance yet not to thick to be used.

To confirm whether a tag size of 17 mm will give the best performance, the test is re-run again.

TABLE 6

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 5 | 60 | 70 | 60 | 70 |
| 9 | 65 | 75 | 70 | 80 |
| 11 | 75 | 80 | 75 | 85 |
| 13 | 75 | 90 | 90 | 90 |
| 15 | 90 | 95 | 90 | 95 |
| 17 | 95 | 100 | 95 | 95 |
| 19 | 95 | 100 | 100 | 95 |
| 21 | 95 | 100 | 95 | 95 |
| 23 | 100 | 100 | 100 | 95 |

Figure 14F:
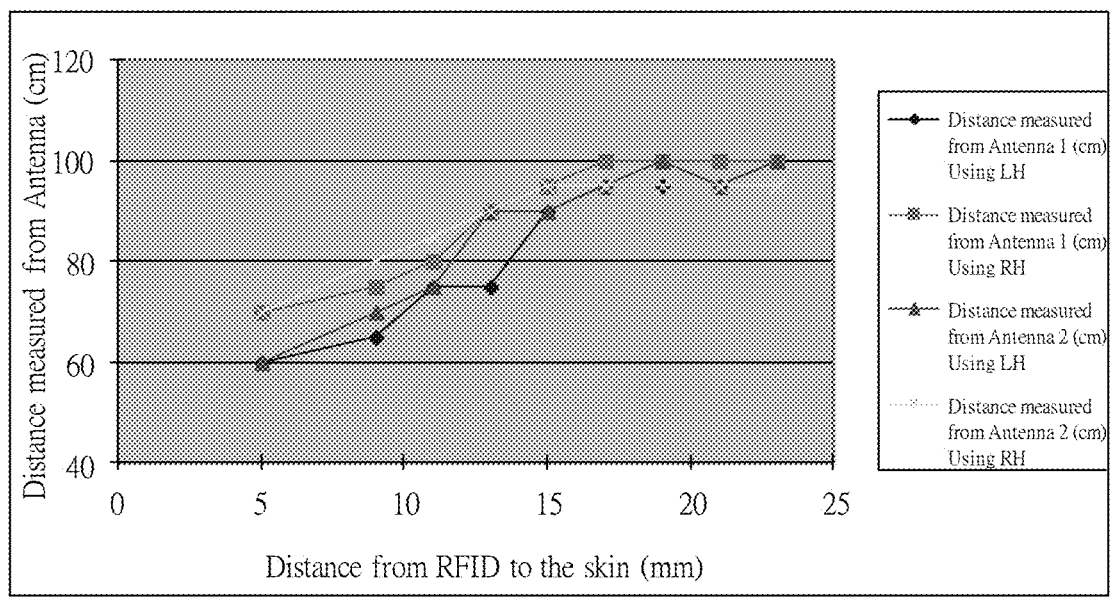

As shown in FIG. 14F, same as test 1, this result runs by another person follows the trend from before, however, the start off point and the end point differs slightly, this could be due to the detuning effect of water in human body in different genders.

Although they range differently, it can still be seen the vales remains at a constant when the tag size is at 17 mm. This seems as if a tag size of 17 mm will give the best performance for both SonneBand 222, 333. Anyhow, the maximum reading range it can reach is only at 95-100 cm.

Test 3—SonneBand 000 RFID tag detection range from two antennas. There will be two parameters changed for each time of test (testing wrist & the thickness of SonneBand).

This test is carried out to decide the position of RFID tag and the thickness of the tag size, tag size ranging from 5 mm to 15 mm with 2 mm intervals are used and the results are as follows:

TABLE 7

| Separating distance from the RFID tag to the skin (mm) | Distance measured from Antenna 1 (cm) | | Distance measured from Antenna 2 (cm) | |
| --- | --- | --- | --- | --- |
| | Using LH | Using RH | Using LH | Using RH |
| 5 | 35 | 35 | 35 | 30 |
| 7 | 45 | 50 | 45 | 45 |
| 9 | 55 | 55 | 55 | 55 |
| 11 | 65 | 65 | 60 | 65 |
| 13 | 85 | 85 | 85 | 85 |
| 15 | N/A | N/A | N/A | N/A |

Figure 14G:
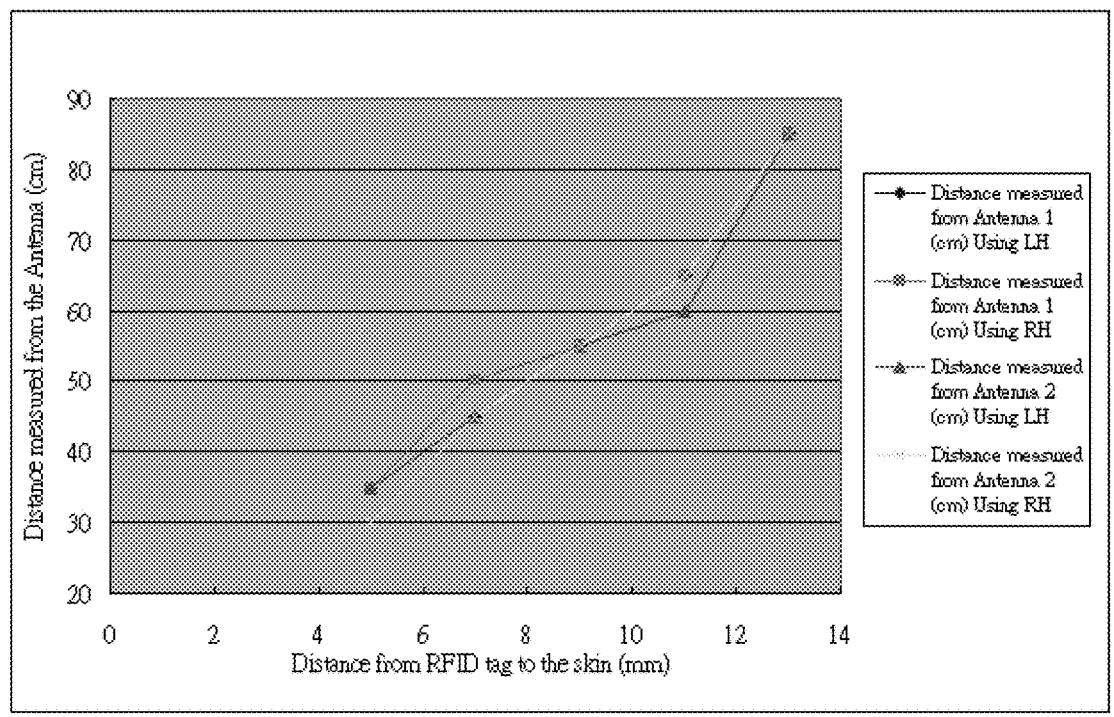

As shown in FIG. 14G, an increasing pattern is obvious, it is concluded that the thicker the tag is, the further the signal can be read. Hence, tag size of 15 mm is not measured. But further test was performed again to find out how thick it should be for a maximum reading range. Also, extra care must be taken to ensure the amount of adhesive tape used is not too much to affect the RFID tag otherwise retests have to be done.

TABLE 8

| Separating distance from the RFID tag to the skin (mm) | Distance measured from Antenna 1 (cm) | | Distance measured from Antenna 2 (cm) | |
| --- | --- | --- | --- | --- |
| | Using LH | Using RH | Using LH | Using RH |
| 5 | 60 | 60 | 60 | 60 |
| 7 | 60 | 60 | 60 | 60 |
| 9 | 75 | 75 | 70 | 75 |
| 11 | 80 | 80 | 75 | 80 |
| 13 | 100 | 95 | 95 | 100 |
| 15 | 100 | 100 | 100 | 100 |
| 17 | 100 | 100 | 100 | 100 |
| 19 | 100 | 100 | 100 | 100 |

Figure 14H:
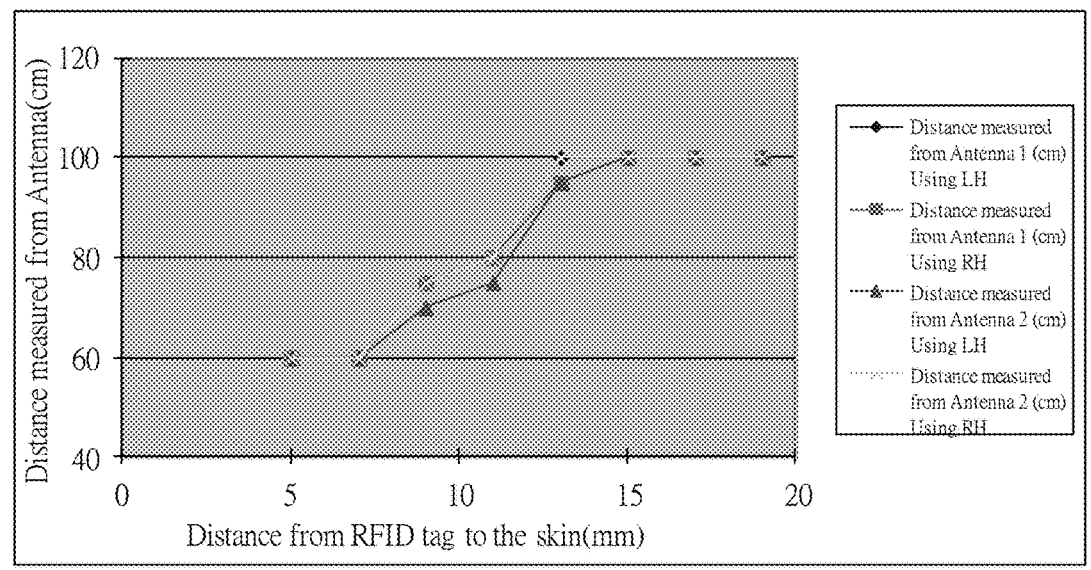

Referring to FIG. 14H, a wider range of tag size is therefore used to prove the above observation. As shown from table 8 and FIG. 14H, it is surprised to see that the reading distance from the Antenna remains constant at 100 cm after having a tag size of 15 mm, this contradicts with the above conclusion that the thicker the tag is, the further the signal can be read. This suggests that a tag size of 15 mm seems to give the best performance and no further thickness should be added to the tag. This shows SonneBand 000, which uses white silicone rubber and has AM tag and RFID tag overlapping inside will give the best performance when the tag size is at 15 mm.

TABLE 9

| Separating distance from the RFID tag to the skin (mm) | Distance measured from Antenna 1 (cm) | | Distance measured from Antenna 2 (cm) | |
| --- | --- | --- | --- | --- |
| | Using LH | Using RH | Using LH | Using RH |
| 5 | 65 | 75 | 75 | 65 |
| 7 | 75 | 70 | 60 | 70 |
| 9 | 70 | 75 | 80 | 80 |
| 11 | 80 | 85 | 85 | 90 |
| 13 | 85 | 90 | 85 | 90 |
| 15 | 90 | 90 | 90 | 95 |
| 17 | 90 | 90 | 90 | 100 |
| 19 | 90 | 90 | 95 | 90 |

Figure 14I:
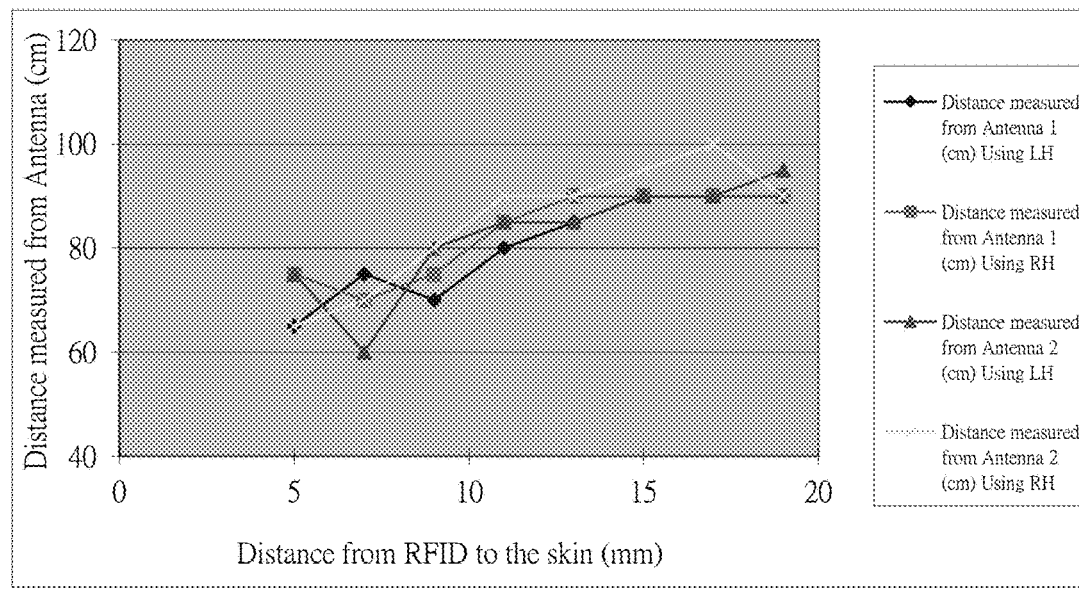

As shown in FIG. 14I, the results obtained follow the trend that the thicker the tag is, the further the signal can be detected, but once again, it remains uniform at 90-100 cm after reaching tag size of 15 cm, this corresponds with the previous outcome, suggested that SonneBand 000 can only give a maximum reading range of 100 cm.

Test 4—SonneBand 000 RFID tag detection range from two antennas with both wrists used. It is used to test for the spacer performance as well as the orientation of the AM tag and the location placed inside SonneBand.

This first trial undergoes using just one wrist to give a brief suggestion of the best location the spacer should be.

TABLE 10

| Silicone rubber layer added to the wristband (mm) | Distance measured from Antenna 1 (cm) | Distance measured from Antenna 2 (cm) |
| --- | --- | --- |
| 0 (no soft silicone added) | 25 | 25 |
| 2 (soft silicone layer added to the middle of the product) | 60 | 60 |
| 2 (soft silicone layer added to the bottom of the product) | 30 | 30 |

Figure 14J:
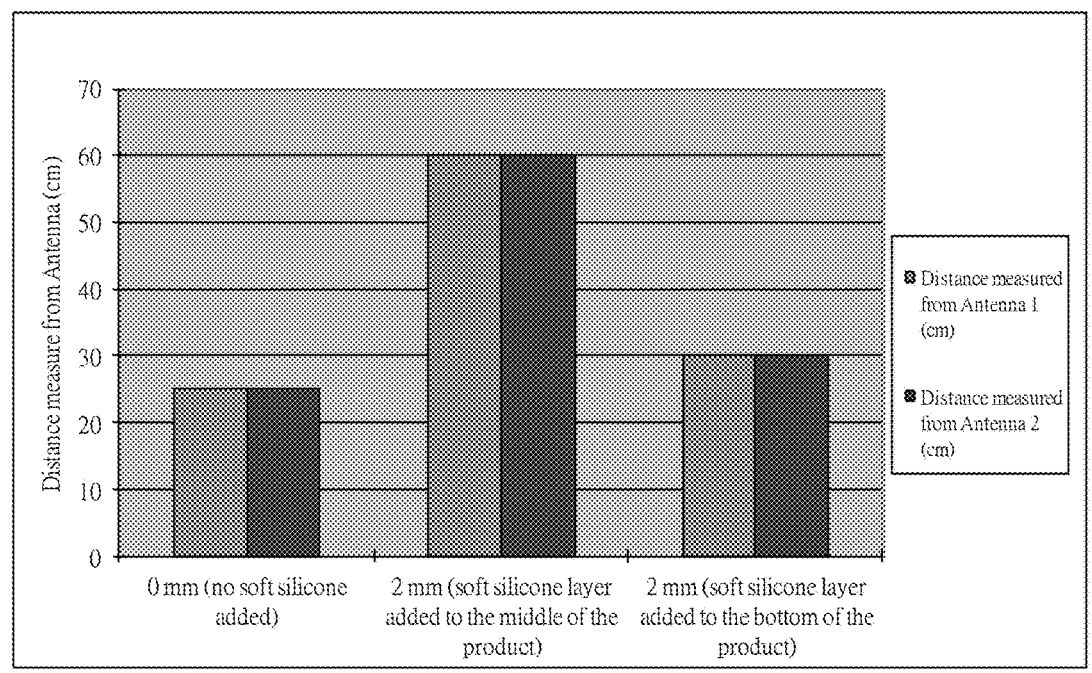

Referring to FIG. 14J, from the above results, it is clear to see that adding soft silicone layer to the band will indeed improves its performance. The signal the Antenna read reaches further, especially when adding the soft silicone layer to the middle of the tags.

To find out whether more silicone layer is needed as well as checking if the middle layer will give the best result, another test is done using both wrists with having a wider range of values in the below circumstances:

1. No silicone layer added to neither the middle nor the bottom
2. No silicone layer added to neither the middle nor the bottom, but has the AM tag in a reversed position
3. 2 mm soft silicone layer added to the middle ONLY
4. 4 mm soft silicone layer added to the middle ONLY
5. 2 mm soft silicone layer added to both the middle and the bottom
6. 6 mm soft silicone layer added to the middle ONLY
7. 4 mm soft silicone layer added to the middle and 2 mm soft silicone layer added to the bottom
8. 4 mm soft silicone layer added to the middle and the bottom respectively
9. 6 mm soft silicone layer added to the middle and 2 mm soft silicone layer added to the bottom

TABLE 11

| Conditions | Distance measured from Antenna 1 (cm) | | Distance measured from Antenna 2 (cm) | |
| --- | --- | --- | --- | --- |
| | Using LH | Using RH | Using LH | Using RH |
| 1 | 5 | 5 | 5 | 5 |
| 2 | 10 | 15 | 15 | 15 |
| 3 | 70 | 70 | 70 | 70 |
| 4 | 200 | 190 | 200 | 190 |
| 5 | 75 | 75 | 70 | 75 |
| 6 | 200 | 200 | 200 | 200 |
| 7 | 110 | 110 | 110 | 120 |
| 8 | 120 | 120 | 120 | 120 |
| 9 | 200 | 200 | 200 | 200 |

Figure 14K:
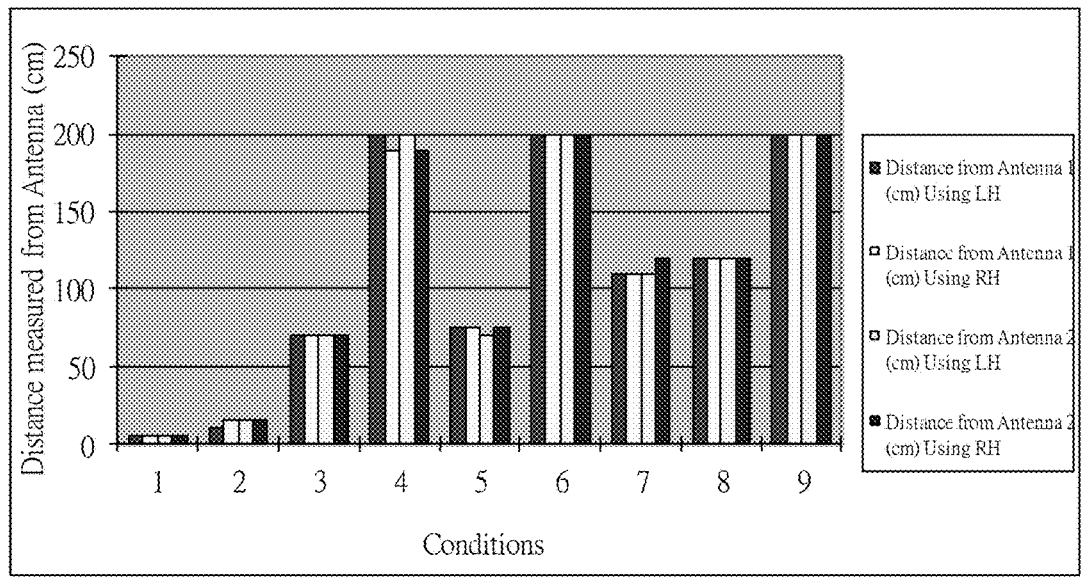

As shown in FIG. 14K, it is found that the performance of the tag improves significantly when adding soft silicone layer, which agrees with the previous test. Comparing conditions 1 & 2, it is discovered that reversing the AM tag increases the signal detection by a double. While comparing conditions 4 & 5, where both has 4 mm of thickness added to it, it is obvious to see condition 4 performs much better than condition 5. The distance measured in condition 4 has an average of 195 cm, which is more than twice the average (73.75 cm) condition 5 has. This leads to a conclusion that adding soft silicone layer to the middle will give the best result. To further supports this conclusion, conditions 6 & 7 and conditions 8 & 9, which both shows having a thicker layer in the middle is observed to bring a better performance to the tag. From these, it is believed that soft silicone can be used as a spacer and will enhance the performance of the SonneBand 000 when adding it to the middle layer. Signals can be detected further as the tag size increases. The maximum reading distance in the test can reach 2 m, which is the furthest distance for the two Antenna ports.

To further supports the above observation, a third test is carried out by a different person, the AM tag is reversed with more combinations of different thickness of layers, the below are the different conditions:
1. No silicone layer added to neither the middle nor the bottom
2. No silicone layer added to neither the middle nor the bottom, but has the AM tag in a reversed position
3. 2 mm soft silicone layer added to the top layer ONLY
4. 10 mm soft silicone layer added to the top layer ONLY
5. 4 mm soft silicone layer added to the middle ONLY
6. 4 mm soft silicone layer added to the middle ONLY with the AM tag reversed
7. 2 mm soft silicone layer added to both the middle and the bottom
8. 2 mm soft silicone layer added to both the middle and the bottom with the AM tag reversed
9. 6 mm soft silicone layer added to the middle ONLY
10. 6 mm soft silicone layer added to the middle ONLY and with the AM tag reversed
11. 4 mm soft silicone layer added to the middle and 2 mm soft silicone layer added to the bottom
12. 4 mm soft silicone layer added to the middle and 2 mm soft silicone layer added to the bottom with the AM tag reversed
13. 4 mm soft silicone layer added to both the middle and the bottom
14. 4 mm soft silicone layer added to both the middle and the bottom and with the AM tag reversed
15. 6 mm soft silicone layer added to the middle and 2 mm soft silicone layer added to the bottom
16. 6 mm soft silicone layer added to the middle and 2 mm soft silicone layer added to the bottom with the AM tag reversed

TABLE 12

| Conditions | Distance measured from Antenna 1 (cm) | | Distance measured from Antenna 2 (cm) | |
| --- | --- | --- | --- | --- |
| | Using LH | Using RH | Using LH | Using RH |
| 1 | 35 | 25 | 40 | 30 |
| 2 | 60 | 50 | 60 | 50 |
| 3 | 35 | 35 | 35 | 30 |
| 4 | 100 | 100 | 100 | 100 |
| 5 | 60 | 55 | 40 | 50 |
| 6 | 65 | 65 | 60 | 65 |
| 7 | 50 | 50 | 50 | 45 |
| 8 | 60 | 60 | 60 | 55 |
| 9 | 80 | 85 | 80 | 85 |
| 10 | 95 | 85 | 90 | 90 |
| 11 | 60 | 55 | 50 | 60 |
| 12 | 65 | 60 | 60 | 60 |
| 13 | 65 | 65 | 60 | 55 |
| 14 | 70 | 80 | 70 | 80 |
| 15 | 100 | 110 | 100 | 110 |
| 16 | 105 | 110 | 105 | 100 |

Figure 14L:
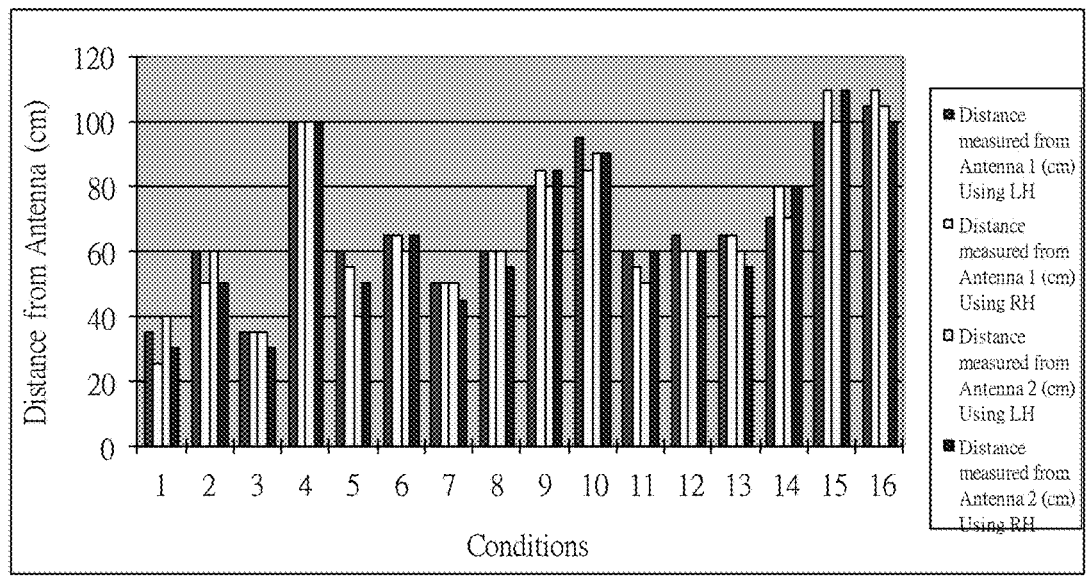

As shown in FIG. 14L, having a wider range of result with reversed AM tag, it is observed that reversing the AM tag can indeed improve the result slightly. The best performance is shown when there is a thicker layer in the middle than at the bottom, which once again, reassure the fact that placing spacer in the middle will improve the result.

Test 5—SonneBand 000 RFID tag detection range from two antennas with different spacer thickness in between the UHF tag & AM tag plus different thickness of silicone layer in between SonneBand and the skin.

Dense Material is used in this test as the spacer to investigate whether it will be a better material to use compared to silicone rubber and ABS plastic.

It is noted that the AM tag inside the SonneBand 000 has a thickness of 1 mm.

The below are the different conditions:
1. Single Layer Dense Material added to the middle ONLY
2. Single Layer Dense Material added to the middle ONLY with the AM tag reversed
3. Single Layer Dense Material added to the middle and 2 mm soft silicone layer added to the bottom
4. Single Layer added to the middle and 2 mm soft silicone layer added to the bottom with the AM tag reversed
5. Single Layer added to the middle and 4 mm soft silicone layer added to the bottom
6. Single Layer added to the middle and 4 mm soft silicone layer added to the bottom with the AM tag reversed
7. Single Layer added to the middle and 6 mm soft silicone layer added to the bottom
8. Single Layer added to the middle and 6 mm soft silicone layer added to the bottom with the AM tag reversed

TABLE 13

| Conditions | Distance measured from Antenna 1 (cm) | | Distance measured from Antenna 2 (cm) | |
| --- | --- | --- | --- | --- |
| | Using LH | Using RH | Using LH | Using RH |
| 1 | 190 | 180 | 190 | 190 |
| 2 | 200 | 200 | 200 | 200 |
| 3 | 180 | 190 | 180 | 190 |
| 4 | 195 | 200 | 190 | 190 |
| 5 | 190 | 190 | 190 | 195 |

TABLE 13-continued

| | Distance measured from Antenna 1 (cm) | | Distance measured from Antenna 2 (cm) | |
|---|---|---|---|---|
| Conditions | Using LH | Using RH | Using LH | Using RH |
| 6 | 195 | 200 | 195 | 195 |
| 7 | 200 | 190 | 190 | 195 |
| 8 | 195 | 200 | 190 | 200 |

Figure 14M:
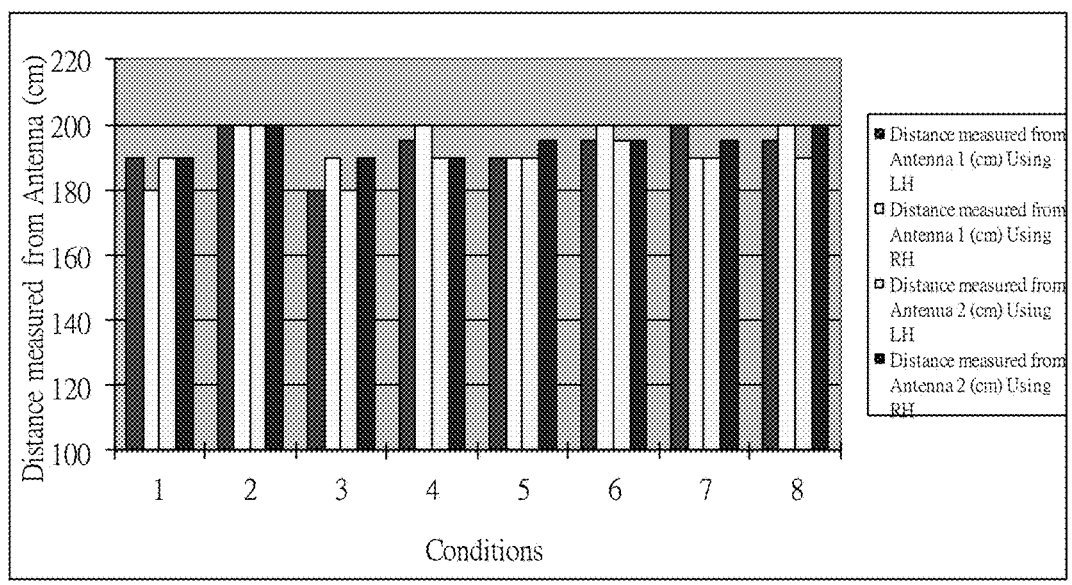

As shown in FIG. 14M, this result suggests Dense Material as a spacer can give a very good performance. The reading range for all the above conditions reaches an average of 193 cm, which is almost the distance of the two antenna ports. This remarkably satisfying result indicates that Dense Material seems to be the best material to be used as a spacer. For further investigation to check if Double Layer Dense Material will give an even better result, placing Double Layer Dense Material in the middle with and without the AM tag reversed respectively, this reads a reading range of 350 cm and 363 cm. These huge increases in reading range suggested that Single Layer will give a good enough performance, but an even thicker layer can further strengthen the detection. It is noticed that a top housing is need to cover the RFID, AM tag as well as the spacer. However, when adding silicone rubber as the top cover, detection will slightly decrease. These indicates that a thicker layer might be better as it can still reach a far enough reading distance after adding the top layer.

Test 6—Check of SonneBand 111 RFID tag performance under the following setting. This provides evidence for the best reading range for SonneBand design consideration.

Tests are done under the following conditions:
1. RFID tag (10 mm) without 3 mm ABS plastic and AM tag
2. RFID tag (10 mm) with AM tag ONLY
3. RFID tag (10 mm) with reversed AM tag ONLY
4. RFID tag (10 mm) with 3 mm ABS plastic ONLY
5. RFID tag (10 mm) with both 3 mm ABS plastic and AM tag
6. RFID tag (10 mm) with both 3 mm ABS plastic and reversed AM tag
7. RFID tag (10 mm) with both 3 mm foam and AM tag
8. RFID tag (10 mm) with both 2 mm silicone rubber layer and AM tag In order to figure out the necessity of spacer, tests are did and in the first testing, we tested conditions 1, 2, 3, 5, 6 & 8 and the results obtained are as follow:

TABLE 14

| Conditions | Distance from Antenna 1 (cm) | Distance from Antenna 2 (cm) |
|---|---|---|
| 1 | 200 | 200 |
| 2 | 100 | 80 |
| 3 | 120 | 100 |
| 5 | 90 | 70 |
| 6 | 100 | 80 |
| 8 | 90 | 65 |

Figure 14N:
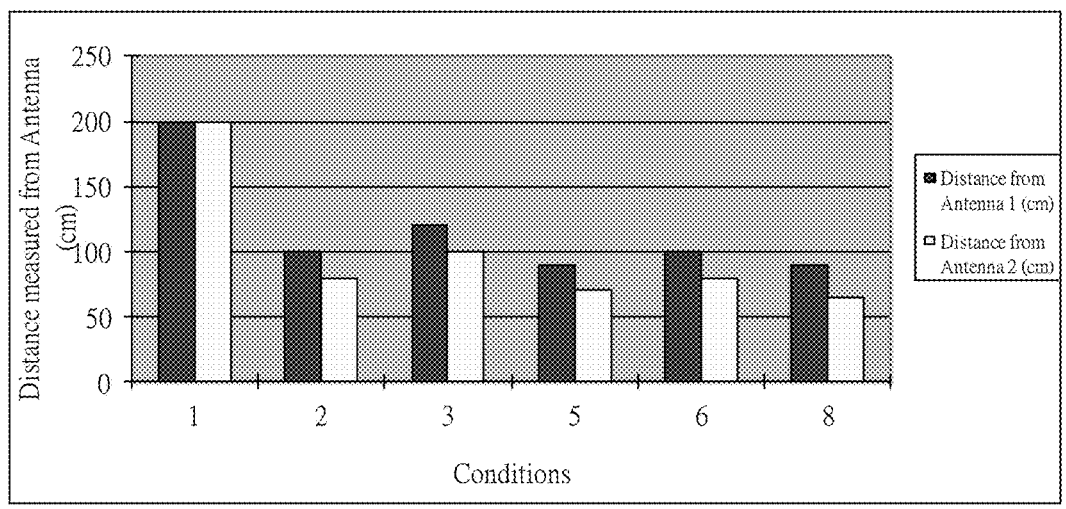

As shown in FIG. 14N, having the ABS plastic in the middle with reversed AM tag seems to give the most reasonable result. As mentioned above, materials with lower dielectric constant are less likely to reflect RF energy and vice versa. Both silicone rubber layer and ABS plastic used carried a dielectric constant of 3. However, the loss tangent of silicone rubber is 0.05 compared to ABS plastic's 0.005. The larger the loss tangent, the more unsuitable the material is. With this slight difference in the values, ABS plastic is considered as a better material to use as a spacer.

To obtain a wider range of results, the first 7 conditions are used and the tests are done again for a higher accuracy:

TABLE 15

| | Distance from Antenna 1 (cm) | | Distance from Antenna 2 (cm) | |
|---|---|---|---|---|
| Conditions | Using LH | Using RH | Using LH | Using RH |
| 1 | >200 | >200 | >200 | >200 |
| 2 | 100 | 110 | 100 | 110 |
| 3 | 120 | 130 | 120 | 130 |
| 4 | 90 | 90 | 85 | 90 |
| 5 | 60 | 55 | 60 | 55 |
| 6 | 70 | 70 | 70 | 65 |
| 7 | 110 | 110 | 105 | 110 |

Figure 14O:
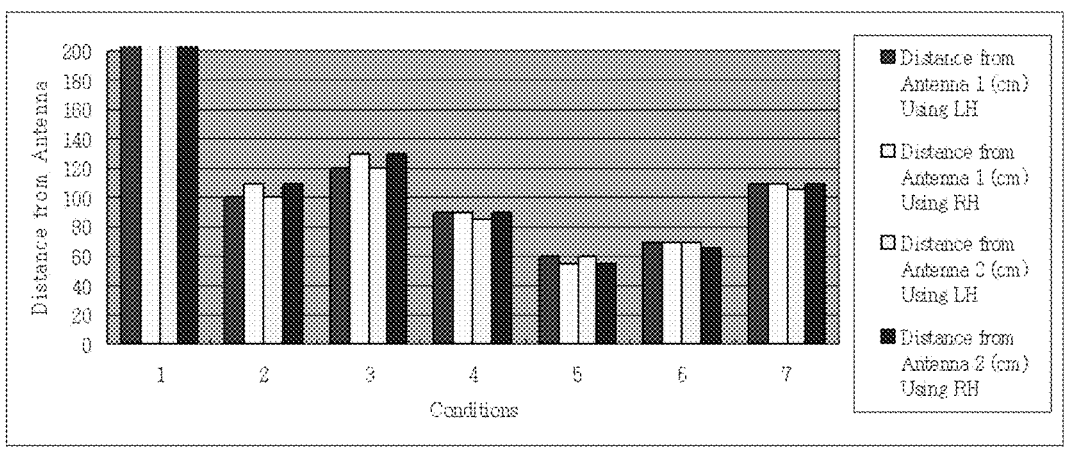

As shown in FIG. 14O, it is concluded that it is true that reversing the AM tag can improve results. Also, AM tag can affect the performance by 50%, while ABS plastic can affect the performance by 52%.

Also, foam seems to have a higher satisfaction than ABS plastic when comparing the corresponded conditions. Moreover, signal detection range reaches the furthest when none of ABS plastic and AM tag is used. These suggested that foam could be tried as a spacer instead of ABS plastic, or try not to use any spacer.

As can be seen, silicone rubber layer and ABS plastic behave similarly in that they do not give a good enough performance. Hence, another person runs a further test using more combinations of foam.

1. RFID tag (10 mm) without 3 mm ABS plastic and AM tag
2. RFID tag (10 mm) with AM tag ONLY
3. RFID tag (10 mm) with reversed AM tag ONLY
4. RFID tag (10 mm) with 3 mm ABS plastic ONLY
5. RFID tag (10 mm) with both 3 mm ABS plastic and AM tag
6. RFID tag (10 mm) with both 3 mm ABS plastic and reversed AM tag
7. RFID tag (10 mm) with both 3 mm foam and AM tag
8. RFID tag (10 mm) with 3 mm foam ONLY
9. RFID tag (10 mm) with both 3 mm foam and reversed AM tag

TABLE 16

| | Distance from Antenna 1 (cm) | | Distance from Antenna 2 (cm) | |
|---|---|---|---|---|
| Conditions | Using LH | Using RH | Using LH | Using RH |
| 1 | >200 | >200 | >200 | >200 |
| 2 | 105 | 70 | 120 | 80 |
| 3 | 120 | 95 | 140 | 80 |
| 4 | 110 | 75 | 120 | 95 |
| 5 | 75 | 60 | 65 | 75 |
| 6 | 95 | 65 | 70 | 75 |
| 7 | 120 | 110 | 115 | 125 |
| 8 | 200 | 200 | 200 | 200 |
| 9 | 140 | 120 | 150 | 130 |

Figure 14P:
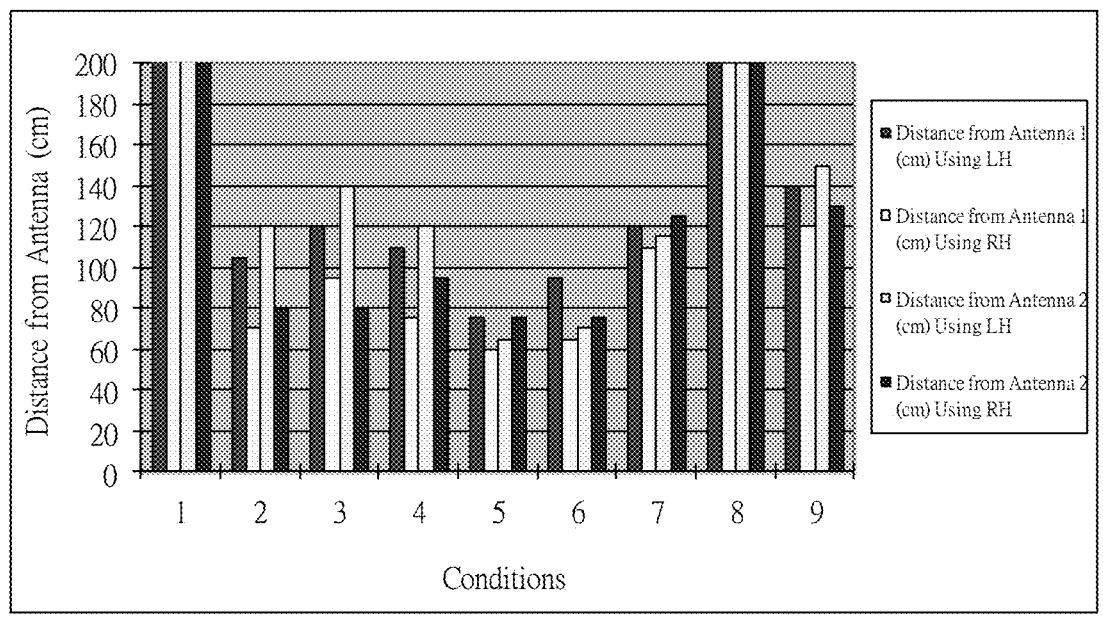

As shown in FIG. 14P, in this retest, foam is used on its own, as well as with AM tag and reversed AM tag, the results when using foam as a spacer give a better performance in compared to those using ABS plastic. The use of foam instead of ABS plastic shows an increase of 170%, while the use of reversed AM tag rather than it in the original position increases by 115%. Using no spacer or foam as a spacer give a similar reading range (200 cm or above). It seems that reversing the AM tag will strengthen the detection.

Test 7—SonneBand 111 RFID tag detection range from two antennas. It is used to test for the spacer performance and the location placed inside SonneBand.

ABS plastic is used in SonneBand 111 as the cover as well as the spacer, it has a thickness of 3 mm, which makes SonneBand 111 thicker than all the other SonneBand used in the above tests.

In order to find out if spacer should be added, the same test as Test 4 is carried out but using ABS plastic instead, noted that it already has 3 mm ABS plastic inside.

TABLE 17

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 10 | 50 | 50 | 50 | 50 |
| 13 (3 mm of ABS plastic is added to the middle of the product) | 130 | 130 | 130 | 130 |
| 13 (3 mm of ABS plastic is added to the bottom of the product) | 65 | 65 | 65 | 65 |
| 13 (3 mm of acrylic is added to the middle of the product) | 130 | 130 | 130 | 130 |

Figure 14Q:
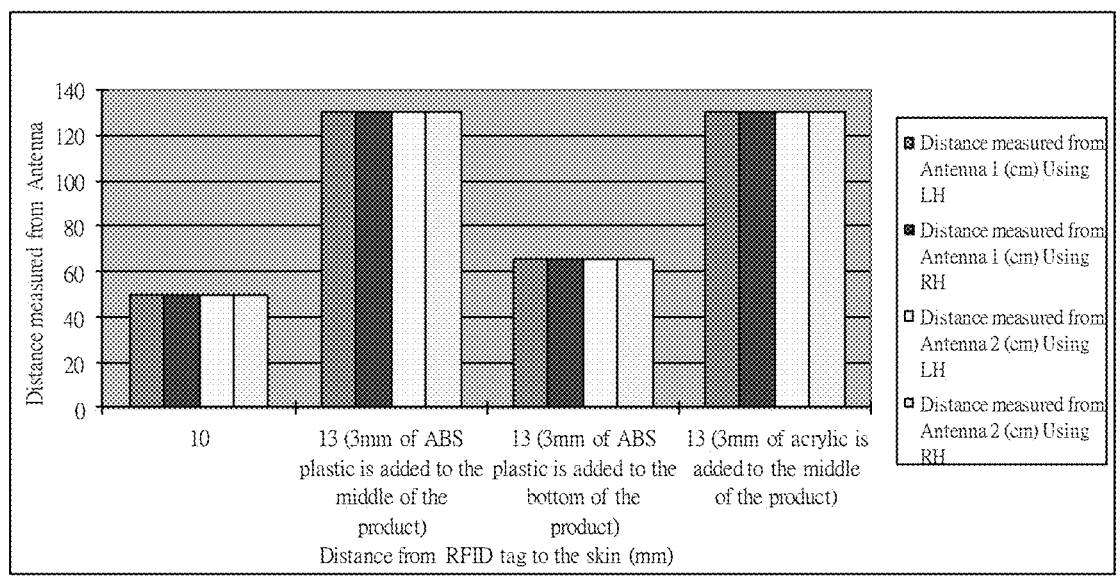

It is clear to see from FIG. 14Q that adding spacer to the tag will give a better performance. Having the spacer in the middle (average of 130 cm) shows a better performance comparing to having it at the bottom (average of 65 cm).

The test is done again for higher accuracy, and 1 mm ABS layer is added to confirm thickness versus reading range. Also, noted that 3 mm ABS plastic was originally in the product:

TABLE 18

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 10 | 60 | 50 | 60 | 50 |
| 13 (3 mm of ABS plastic is added to the middle of the product) | 120 | 110 | 120 | 110 |
| 13 (3 mm of ABS plastic is added to the bottom of the product) | 80 | 85 | 85 | 85 |
| 13 (3 mm of acrylic is added to the middle of the product) | 200 | 200 | 190 | 200 |
| 11 (1 mm of ABS plastic is added to the middle of the product) | 135 | 140 | 140 | 140 |
| 10 (Using Single Layer foam instead of 3 mm ABS plastic) | 120 | 110 | 110 | 110 |
| 10 (Using Single Layer Dense Material instead of 3 mm ABS plastic) | 130 | 140 | 130 | 130 |
| 10 (Using Single Layer Dense Material and reversing the AM tag) | 200 | 200 | 200 | 200 |
| 10 (Having nothing in it) | 100 | 100 | 100 | 100 |

Figure 14R:
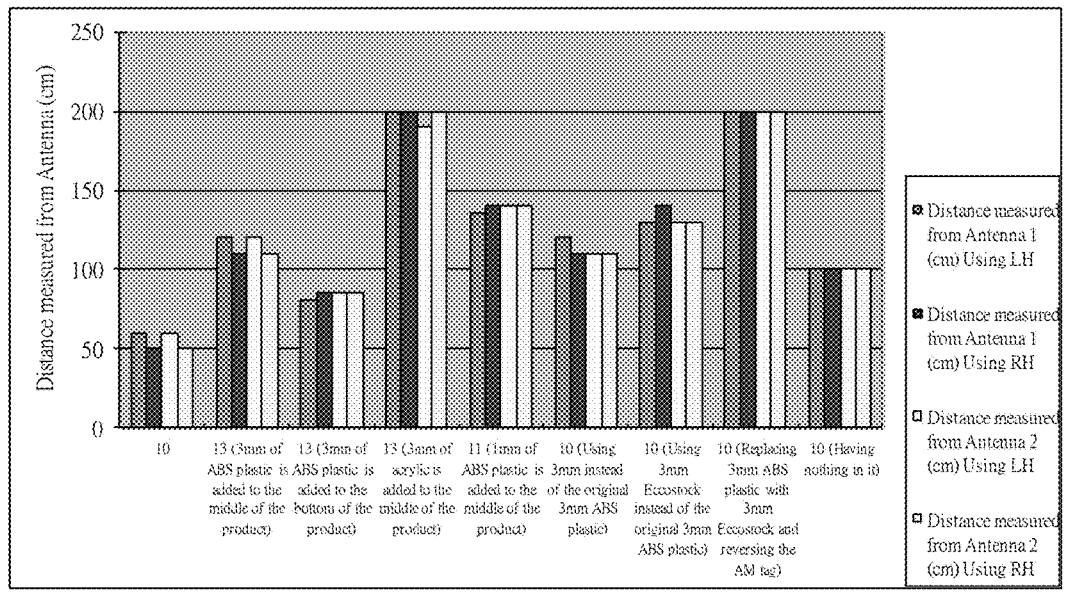

As shown in FIG. 14R, this follows the previous results, and it is believed that having the spacer in the middle will give the best result, in comparison to having it at the bottom. Acrylic seems to behave the best. While a thinner layer of ABS plastic shows a better performance than the thicker one.

To give a fair test, it is re-run by another person and the results are as follows:

TABLE 19

| Separating distance from the RFID tag | Distance measured from Antenna 1 (cm) | | Distance measured from Antenna 2 (cm) | |
|---|---|---|---|---|
| to the skin (mm) | Using LH | Using RH | Using LH | Using RH |
| 10 | 60 | 80 | 60 | 50 |
| 13 (3 mm of ABS plastic is added to the middle of the product) | 100 | 115 | 130 | 110 |
| 13 (3 mm of ABS plastic is added to the bottom of the product) | 70 | 85 | 75 | 50 |
| 13 (3 mm of acrylic is added to the middle of the product) | 140 | 150 | 160 | 150 |
| 11 (1 mm of ABS plastic is added to the middle of the product) | 125 | 145 | 120 | 140 |
| 10 (Using Single Layer foam instead of 3 mm ABS plastic) | 110 | 120 | 110 | 100 |
| 10 (Using Single Layer Dense Material instead of 3 mm ABS plastic) | 135 | 125 | 200 | 120 |
| 10 (Using Single Layer Dense Material and reversing the AM tag) | 145 | 130 | 200 | 120 |
| 10 (With AM tag in it only) | 90 | 90 | 95 | 80 |

Figure 14S:
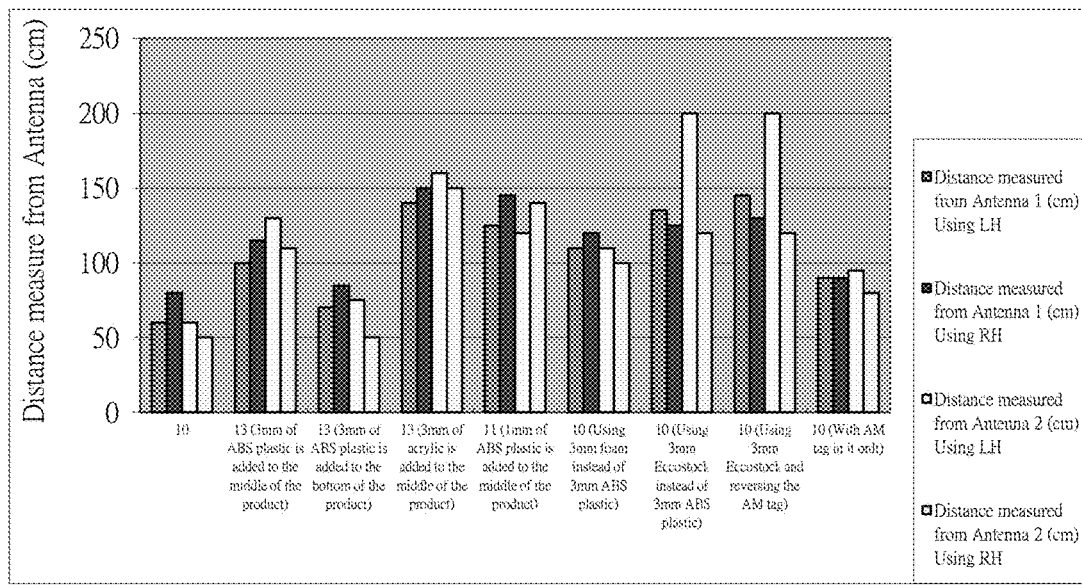

As shown in FIG. 14S, the reading of 200 cm when using Single Layer Dense Material instead of 3 mm ABS plastic in SonneBand 111 using left hand could be an anomaly, as it doesn't follow the above result, while the others look reasonably similar. The best performance seems to show up when having Single Layer Dense Material and AM tag reversed, giving an average reading range of 150 cm.

Test 8—Check of SonneBand 111 RFID tag performance by reversing the orientation of acousto magnetic tag and see if it can affect the performance of RFID tag.

As to how AM tag can affect the performance, reversed AM tag with ABS layer is added to different location:

TABLE 20

| Separating distance from the reversed RFID tag to the skin (mm) | Distance from Antenna 1 (cm) | | Distance from Antenna 2 (cm) | |
|---|---|---|---|---|
| | Using LH | Using RH | Using LH | Using RH |
| 10 | 70 | 70 | 70 | 70 |
| 13 (3 mm ABS layer added to the middle) | 120 | 130 | 110 | 130 |
| 13 (3 mm ABS layer added to the bottom) | 90 | 95 | 85 | 85 |
| 13 (3 mm acrylic layer added to the middle) | 200 | 200 | 200 | 200 |
| 11 (1 mm ABS layer added to the middle) | 150 | 160 | 160 | 160 |

Figure 14T:
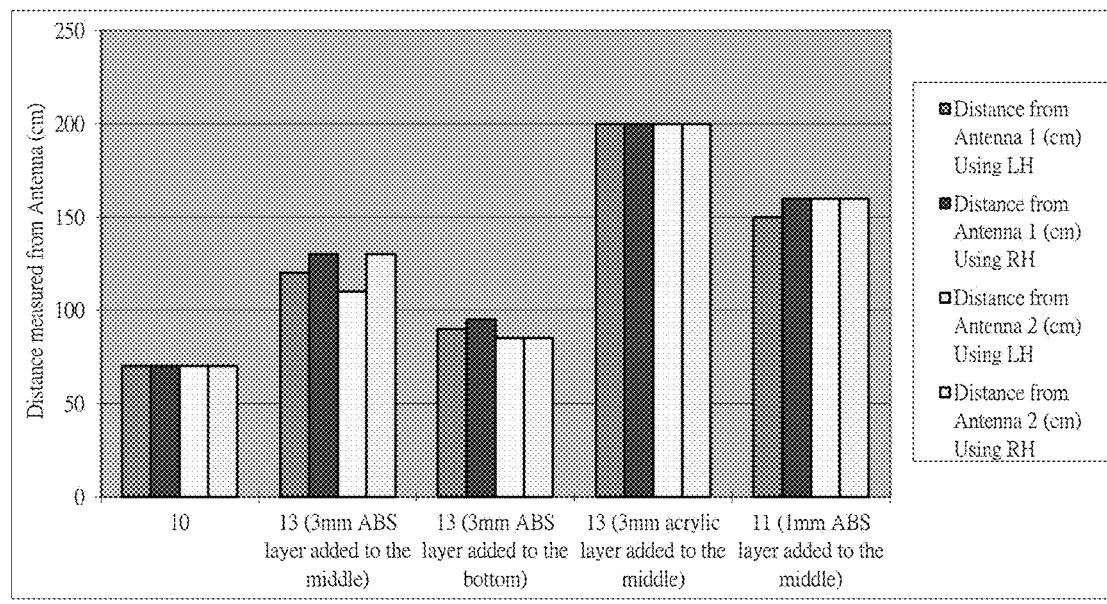

Referring to FIG. 14T, this can be used as a comparison with the results found in Test 6. As shown in table 20 and FIG. 14T, it is discovered that having the AM tag reversed can improve the performance in all the locations noticeably.

Test 9—Check of SonneBand 999 RFID tag performance under the following setting. This provides evidence for the best reading range for tag design consideration.

SonneBand 999 is thicker than all the tags used above. It has a thickness of 13 mm. In this test, it is figured out the necessity of the spacer in it. AM tag is reversed as well as using 6 mm ABS and foam may determine whether this will give a better performance to all the others in comparison.

The conditions are as follows:
1. RFID tag (13 mm) without ABS plastic and AM tag
2. RFID tag (13 mm) with AM tag ONLY
3. RFID tag (13 mm) with reversed AM tag ONLY
4. RFID tag (13 mm) with 6 mm ABS plastic ONLY
5. RFID tag (13 mm) with both 6 mm ABS plastic and AM tag
6. RFID tag (13 mm) with both 6 mm ABS plastic and reversed AM tag
7. RFID tag (13 mm) with both 6 mm foam and AM tag

TABLE 21

| Conditions | Distance from Antenna 1 (cm) | | Distance from Antenna 2 (cm) | |
|---|---|---|---|---|
| | Using LH | Using RH | Using LH | Using RH |
| 1 | >200 | >200 | >200 | >200 |
| 2 | >200 | >200 | >200 | >200 |
| 3 | >200 | >200 | >200 | >200 |
| 4 | 115 | 120 | 125 | 130 |
| 5 | 100 | 100 | 100 | 100 |
| 6 | 105 | 110 | 110 | 110 |
| 7 | >200 | >200 | >200 | >200 |

Figure 14U:
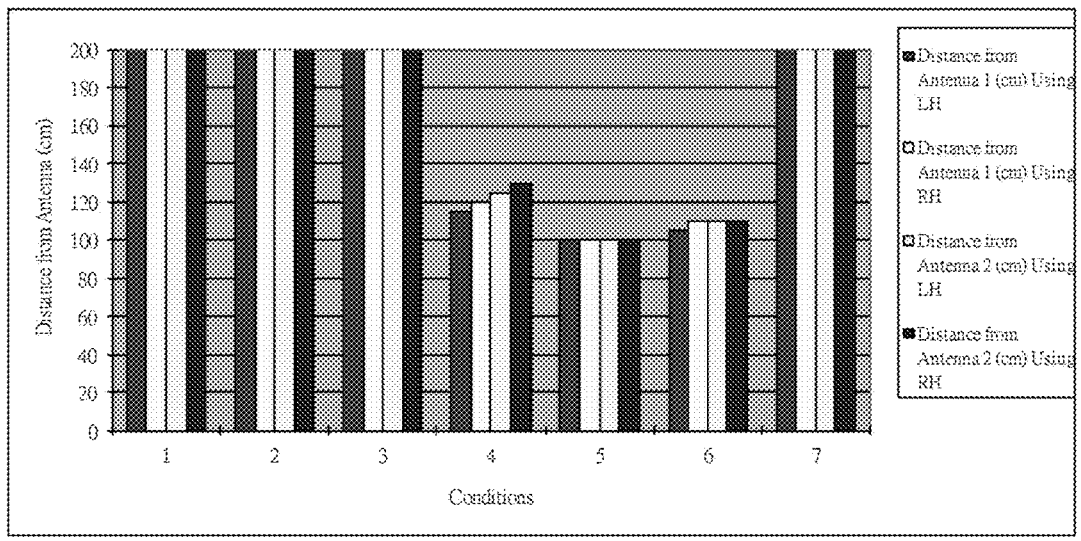

As shown in FIG. 14U, the results from conditions 5 & 6 suggested that reversing the AM tag would improve the result slightly. As shown from conditions 1 & 7, either no spacer used or foam can be used instead of ABS plastic to provide a wide reading range (greater than 200 cm). Omitting the AM tag (shown in conditions 4 & 5) will improve the result by 20%, while omitting the 6 mm ABS tag (shown in conditions 2 & 5) improve by more than a double. This means that the material used as a spacer may need to re-select.

Another test is done to reassure the result.

TABLE 22

| Conditions | Distance from Antenna 1 (cm) | | Distance from Antenna 2 (cm) | |
|---|---|---|---|---|
| | Using LH | Using RH | Using LH | Using RH |
| 1 | 200 | 200 | 200 | 200 |
| 2 | 200 | 200 | 200 | 200 |
| 3 | 200 | 200 | 200 | 200 |
| 4 | 95 | 110 | 75 | 110 |
| 5 | 80 | 85 | 70 | 80 |
| 6 | 95 | 100 | 80 | 95 |
| 7 | >200 | >200 | >200 | >200 |

Figure 14V:
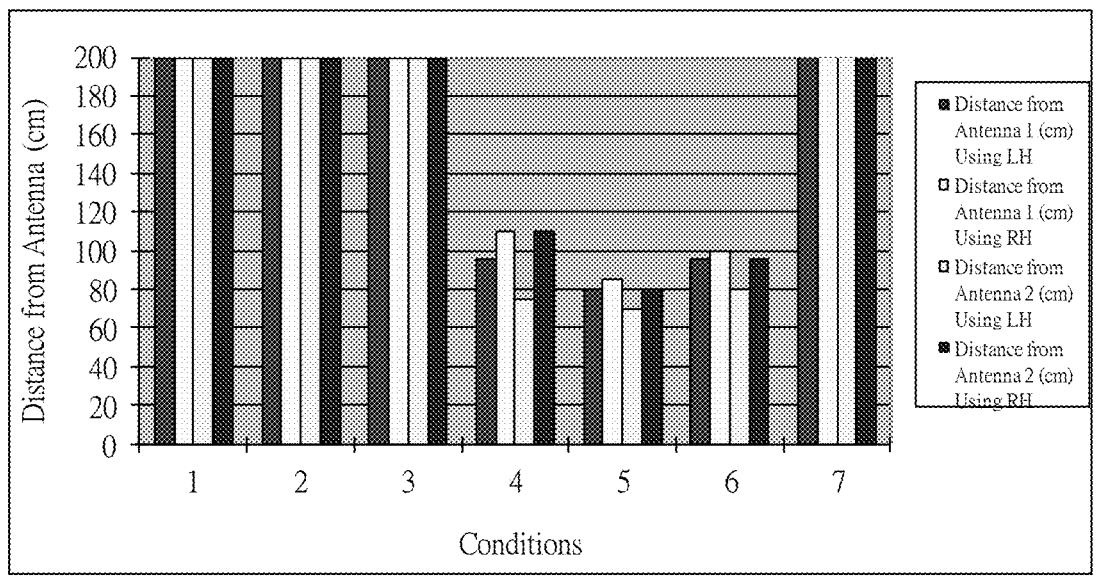

As shown in FIG. 14V, the retest done by another person seems to verify the fact that either having no spacer or using 6 mm foam as a spacer can give the best result with or without the AM tag reversing. Although the test doesn't give an exact data of using 6 mm foam with the AM tag reversed, it is convinced that the result will have a minimum of 200 cm, which is the maximum distance for the two Antenna ports), as the above tests have suggested that reversing the AM tag can give a better performance.

DISCUSSION & CONCLUSION

Active RFID tag have a read range of up to 300 feet (100 meters) and can be read reliably because they continuously send a signal to the reader. They will also suffer detuning or shielding effect from metal and water object if they place close to them. However, the long read range of active RFID tag which makes it in-significantly decrease in the read range.

The disadvantage of active RFID tag is that the investment cost of the tag, battery requirement and the electromagnetic interference to medical devices.

Passive RFID tag has no power source and no transmitter, and it is cheaper than active tags and required no maintenance. Furthermore, it can be smaller because it has no battery; instead, the tag uses the radio energy transmitted by the reader. Passive tags can operate at low frequency, high frequency and ultra-high frequency. Low-frequency systems generally operate at 124 kHz, 125 kHz or 135 kHz. High-frequency systems use 13.56 MHz, and ultra-high frequency systems use a band anywhere from 860 MHz to 960 MHz. Generally, with the higher in frequency, the more data and read range can be obtained. The side effect is that increase in the frequency of RF which turns it to behave more like light beam. They will be absorb by high dielectric materials and bounce off from metal object as expressed in the academic theory above. With the optimized separating distance and low dielectric constant materials in between the object and RFID tag, the reading range can be improved.

From the above, this phenomenon is confirmed and base on the existing results, SonneBand (a dual Acousto-Magnetic tag & passive UHF RFID tag) with an optimized reading range and size is designed.

Furthermore, overlapping the Acousto-Magnetic tag may improve the RFID tag performance on human body since the metal surface of Acousto-Magnetic tag can reflect off the RF waves and provide more power to the tag if the position placed properly. From the SonneBand 111 & SonneBand 000, this result is seen and with suitable material as spacer in between them, the read range can greatly improve.

In addition to these results, it is accidentally discovered that reversing the Acousto-Magnetic tag can help to improve the performance of RFID tag. It is well understood that Acousto-Magnetic Tag is made of two strips, a strip of magnetostrictive, ferromagnetic amorphous metal and a strip of a magnetically semi-hard metallic strip, which is used as a biasing magnet (to increase signal strength) and to allow deactivation. Those strips are not bound together but free to oscillate mechanically. Amorphous metals are used in such systems due to their good magnetoelastic coupling, which implies that they can efficiently convert magnetic energy into mechanical vibrations. Existing Acousto Magnetic tags are using either DR (dual resonator) or LE (low energy single layer), we choose to use preferably at least three layers which can provide better performance and pick-up rate.

As UHF tag is operated at high frequency, they are not easily affected by external magnetic field but the metal object will be a great concern. Thus, with the amorphous metal far away from the RFID tag, it may help to improve the read range. FIGS. 13A and 13B illustrate the composition of Am tag and how its orientation can affect the read range of UHF tag.

The preceding description is intended to provide an overview of device hardware and other operating components suitable for performing the methods of the present application described herein. This description is not intended to limit the applicable environments or the scope of the present application. Similarly, the hardware and other operating components may be suitable as part of the apparatuses described above. The present application can be practiced with other system configurations, including personal computers, multiprocessor systems, microprocessor-based or programmable electronic device, network PCs, minicomputers, mainframe computers, and the like.

Some portions of the detailed description are presented in terms of algorithms and symbolic representations of operations on data bits within a computer memory. These algorithmic descriptions and representations can be used by those skilled in the computer and software related fields. In one embodiment, an algorithm is generally defined as a self-consistent sequence of operations leading to a desired result.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The aspects, embodiments, features, and examples of the present application are to be considered illustrative in all respects and are not intended to limit the present application, the scope of which is defined only by the claims. Other embodiments, modifications, and usages will be apparent to those skilled in the art without departing from the spirit and scope of the claimed present application.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the present application as if each value were specifically enumerated herein. In addition, smaller ranges between and including the upper and lower limits of a given range are contemplated and encompassed within the present application. The listing of exemplary values or ranges is not a disclaimer of other values or ranges between and including the upper and lower limits of a given range.

What is claimed is:

1. A hybrid security system with a combination tag combined a passive radio frequency identification (RFID) tag and an acousto-magnetic (AM) tag, comprising:
    a passive RFID tag;
    an AM tag; and
    an enclosure housing the RFID tag and the AM tag;
    a pedestal embedded with an electronic article surveillance (EAS) antenna and a RFID antenna; and
    a RFID reader;
    an EAS relay and an EAS controller, wherein
    the AM tag comprises a bias magnetic layer and at least one strip of amorphous alloy, and the at least one strip of amorphous alloy is far away from the RFID tag,
    the pedestal is configured to sense the AM tag of the combination tag and trigger the RFID reader to read the RFID tag of the combination tag when presence of the AM tag is sensed, and
    the EAS controller uses an output of the EAS relay to trigger a general purpose input/output (GPIO) of the RFID reader; and the RFID reader is configured to automatically check status of the GPIO and allow the RFID antenna to emit RF for a period preset by a user when the GPIO is high input.

2. The security system of claim 1, further comprising: a spacer housed in the enclosure and disposed between the RFID tag and the AM tag; wherein the spacer is a layer of low dielectric constant material having a thickness ranging from 3 mm to 10 mm.

3. The security system of claim 1, wherein the enclosure is made of ABS plastic or silicone rubber.

4. The security system of claim 1, wherein the enclosure comprises a top housing and a bottom housing, and a write-on surface pad is disposed on a top surface of the top housing.

5. The security system of claim 4, wherein the bottom housing has a thickness of 1 mm.

6. The security system of claim 4, wherein a 3M sticker is disposed on a bottom surface of the bottom housing.

7. The security system of claim 2, wherein the spacer is made of a closed cell, cross-linked hydrocarbon foam with low dielectric loss, low dielectric constant, and low density.

8. The security system of claim 2, wherein the spacer is made of a material which is light-weight, weather resistant and has negligible water absorption and provides excellent thermal insulation, while its dielectric constant does not change with frequency and temperature.

9. The security system of claim 2, wherein the spacer is used for isolating the RFID tag and the AM tag by reducing electromagnetic interference in free space or closed cavity environments.

10. The security system of claim 1, wherein the AM tag comprises at least three strip of amorphous alloys.

\* \* \* \* \*